(12) United States Patent
Callaway et al.

(10) Patent No.: US 6,729,794 B2
(45) Date of Patent: May 4, 2004

(54) ADJUSTABLE LOCKING MOUNT AND METHODS OF USE

(75) Inventors: George H. Callaway, Raleigh, NC (US); Dennis M. McDevitt, Raleigh, NC (US)

(73) Assignee: Incumed, Inc., Raleigh, NC (US)

( * ) Notice: Subject to any disclaimer, the term of this patent is extended or adjusted under 35 U.S.C. 154(b) by 0 days.

(21) Appl. No.: 10/342,807

(22) Filed: Jan. 15, 2003

(65) Prior Publication Data

US 2003/0129019 A1 Jul. 10, 2003

Related U.S. Application Data

(63) Continuation-in-part of application No. 10/041,707, filed on Jan. 8, 2002.

(51) Int. Cl.$^7$ .................................................. B25G 3/02
(52) U.S. Cl. ....................................... 403/364; 403/373
(58) Field of Search ................................ 403/110, 116, 403/112, 113, 114, 115, 117, 263, 90, 364, 378, 294, 292, 373, 374.1, 374.2, 374.4

(56) References Cited

U.S. PATENT DOCUMENTS

| | | | | |
|---|---|---|---|---|
| 4,051,924 A | * | 10/1977 | Yoshigai | 188/24.12 |
| 5,709,500 A | * | 1/1998 | Mizelle et al. | 403/364 |
| 6,273,390 B1 | * | 8/2001 | Meyer | 248/507 |
| 2002/0136600 A1 | * | 9/2002 | Thompson et al. | 403/364 |
| 2002/0187843 A1 | * | 12/2002 | Krude | 464/157 |

* cited by examiner

Primary Examiner—John R. Cottingham
(74) Attorney, Agent, or Firm—Glasgow Law Firm, PLLC

(57) ABSTRACT

An adjustable locking mount system permits rotation about at least one of x, y, and z axes. Methods provide for rotating and rocking the mount to obtain the desired position, fixing the mount in the desired position, and mounting an object onto the mount.

25 Claims, 31 Drawing Sheets

ADJUSTABLE LOCKING MOUNT AND METHODS OF USE

CROSS-REFERENCE TO RELATED APPLICATIONS

This nonprovisional utility patent application claims the benefit of one or more prior filed copending nonprovisional applications; a reference to each such prior application is identified as the relationship of the applications and application number (series code/serial number): The present application is a Continuation-In-Part of application Ser. No. 10/041,707, Jan. 8, 2002 which is incorporated herein by reference in its entirety.

FIELD OF THE INVENTION

This invention generally relates to adjustable mounting devices.

BACKGROUND OF THE INVENTION

Adjustable mounting devices are commonly employed to mount one object or device onto another object, device, or structure. Typically, the position of the mount needs to be adjusted until the desired position is achieved. The desired position can then be secured by locking the device in the position, e.g., by tightening a screw.

However, conventional adjustable mounts provide a limited range of adjustment. Further, even upon locking the device in a desired position, conventional mounts may not hold the desired position. This is especially true when force is exerted upon the mounted object, e.g., hammering or striking the object to secure it on the mount.

SUMMARY OF THE INVENTION

The invention provides an adjustable mount that permits a wide range of adjustment along or about multiple axes. The invention also provides an adjustable mount that makes possible a straightforward, yet robust way of securing the device in a desired position and maintaining the device in that desired position. The invention is applicable for use in diverse environments, including the medical field.

One aspect of the invention provides an adjustable mount assembly and related methods comprising a mount defining a mounting surface carried by a pivot surface for movement relative to at least one of an x-axis, a y-axis, and a z-axis, where the z-axis is the axis of the pivot surface. The invention further comprises a locking mechanism configured to free the mount for movement and to restrain the mount against movement.

Another aspect of the invention provides an adjustable mount assembly and related methods comprising a mount defining a mounting surface carried for movement relative to a support. The invention further comprises a locking mechanism comprising a series of stacked washers to free the mount for movement and to restrain the mount against movement.

Yet another aspect of the invention provides a multi-laminae adjustable mount assembly device composed of at least two mounting components, each with a mounting area, a respective series of stacked, compressible laminae, at least two compressor laminae compressible in opposition, and a compression device; wherein the stacked laminae series are interleaved and the compression device compresses the stacked, interleaved laminae, and the relative movement of the at least two mounting components is permitted in at least one of the three axes of movement when the laminae series are in an uncompressed state.

A single mount can be used to mount an object or device in diverse environments, e.g., to mount an audio speaker.

A plurality of mounts can be coupled together along an orientation axis to form an articulated mounting assembly. The orientation axis can be linear or curvilinear. Each mount can have a pivot axis either along or transverse to the orientation axis. A mounting assembly can be used in diverse environments, e.g., to mount a series of objects or devices, such as lights.

Yet another aspect of the present invention is to provide an external fixation device for biomedical applications having a composite mounting assembly affixable at an exterior portion of a body for releasably securable mounting at least two mounting assemblies, wherein at least one of the assemblies includes a multi-laminae adjustable mount assembly, including at least two mounting components; each with a mounting area; the movement of each mounting component constrained by a respective series of stacked, compressible laminae; at least two compressor laminae compressible in opposition; and a compression device; wherein the stacked laminae series are interleaved and the compression device compresses the stacked, interleaved laminae.

Methods provide for rotating or rocking the mount to obtain the desired position. The methods further provide for securing the mount in the desired position and mounting an object on the mount.

Other features and advantages of the inventions are set forth in the following specification and attached drawings.

DEFINITIONS

Lamina—A thin plate, sheet, or layer.
Laminate—consisting of or arranged in laminae.
Platyplanar—flat planar shaped
Curviplane—curved or arched planar shaped

DETAILED DESCRIPTION

Figure 1:
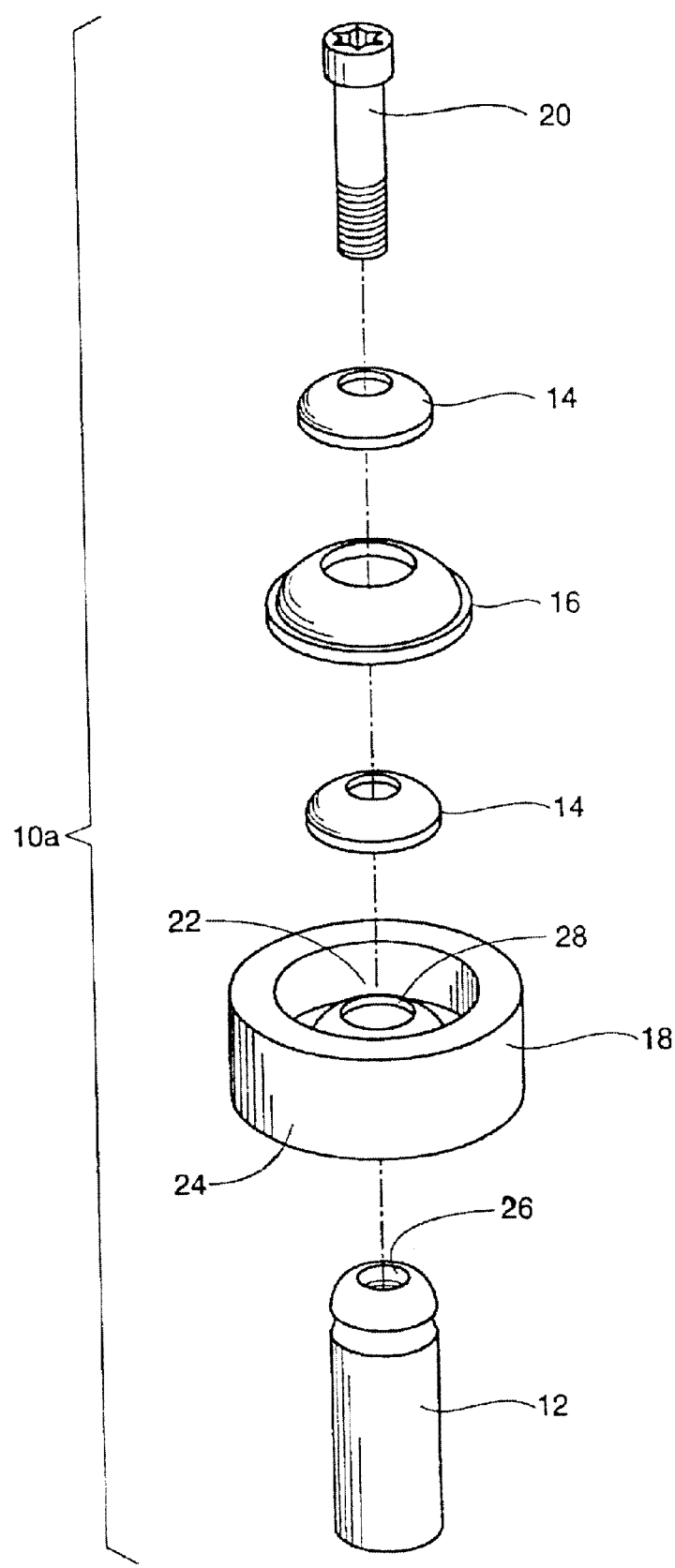
FIG. 1 is an exploded view of the components of an adjustable locking mount system that embodies features of the invention, in which the mounting hub is centric.

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figure 21:
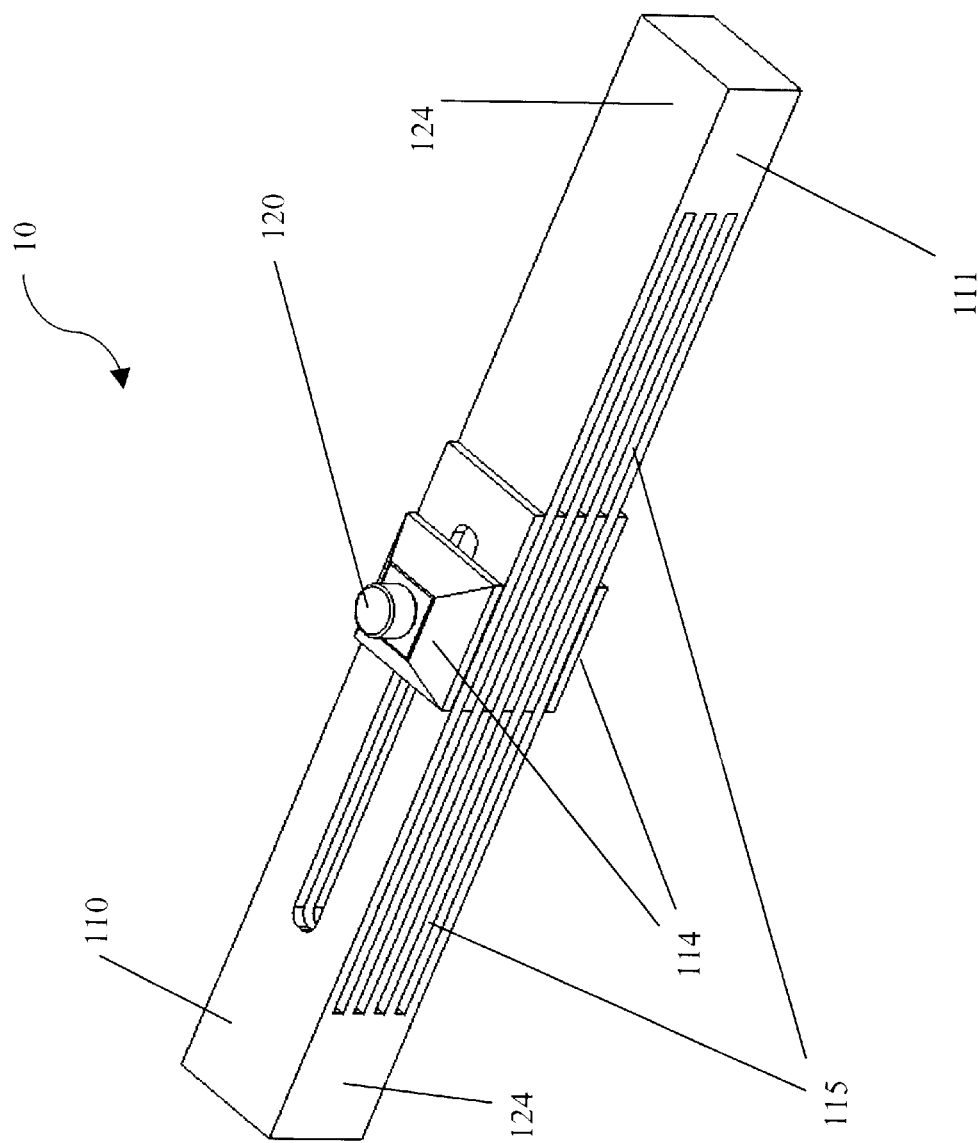
FIG. 21 is a perspective view of an adjustable mount assembly that embodies features of the present invention, in which the stacked laminae are platyplanar, rectangular, and with no guide.

Referring now to the drawings in general, the illustrations are for the purpose of describing a preferred embodiment of the invention and are not intended to limit the invention thereto. As best seen in FIG. 21, the present invention, generally described as 10, comprises a multi-laminae adjustable mount assembly. As shown in FIG. 21, the present invention includes at least two (2) mounting components 110 and 111 with respective mounting area 124. The mounting areas are provided for mounting an object, such as moveable object to be positioned or a stationary support. Alternatively, the object can be integral with the mounting-component (not shown); that is, a mounting component and mounted object are manufactured as a single unit. The mounting area can also be eccentric, which provides greater adjustment range for the mounted object, as described herein and shown in FIG. 6.

Figure 23:
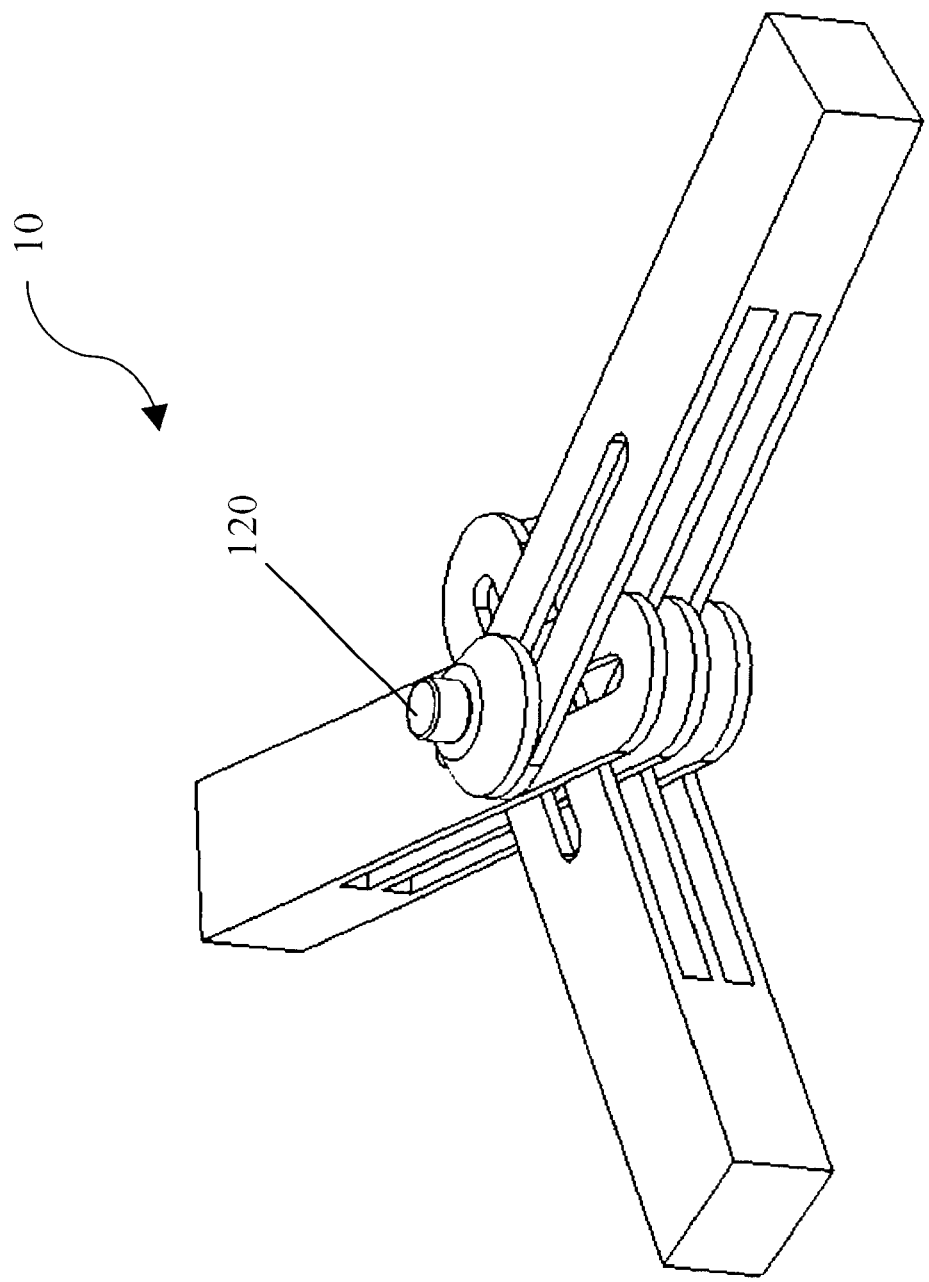
FIG. 23 is a perspective view of an adjustable mount assembly that embodies features of the present invention, in which the stacked laminae are planar, rectangular, and with no guide, and the assembly includes 3 mounting components with respective stacked laminae.

At least two mounting-components are necessary for an embodiment of the invention. Embodiments with three (3) or more mounting-components are also within the scope of the present invention and described herein. For example, FIG. 23 shows an embodiment according to the present invention with 3 mounting-components.

The at least two mounting components are each in contact with and constrained by a respective series of stacked, compressible laminae 115. The laminae constrain relative movement of their respective component, such that immobilization of a laminae series will immobilize the respective mounting component.

Figure 10:
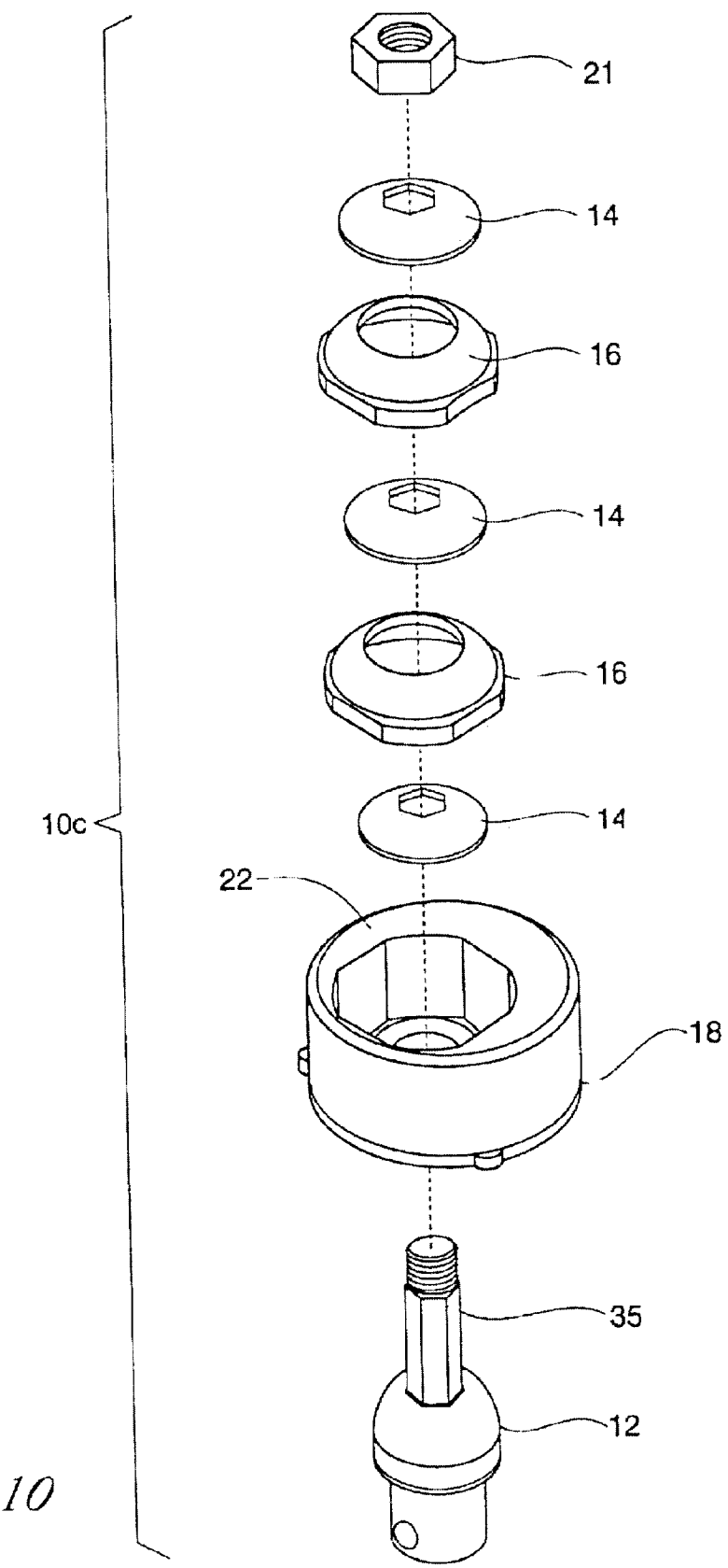
FIG. 10 is an exploded view of the components of an alternative embodiment of an adjustable locking mount system that embodies features of the invention.

This constraint can be provided by a permanent physical connection between the component and its laminae series or by a fit constraint between the component and the laminae series. In the case of a permanent physical connection, the component and laminae series may be manufactured from a single piece or may be bonded together, such as by gluing or welding, at a later time. In the case of a fit constraint, the component and respective laminae series are designed to fit together such that relative movement between the components is non-existent or insignificant when the system is fixed in a position. An example of a system with fit constraint of two components is shown in FIG. 10. In this system, the first component 18 and first stacked series of laminae 16 are not permanently joined, but are independent. However, the octagonal shape of the interior circumference of the first component and complementary shape of the exterior circumference of the laminae and the tolerances between these two parts are such that the first component will not move significantly when the first stacked laminae series are immobilized. Likewise, the second component 35 and second stacked series of laminae 14 are not permanently joined, but are independent, and the hexagonal shape and diameters of the central hole in the laminae series and the complementary shape and exterior diameter of the second component are such that the component does not move significantly in the plane of the laminae. Thus, rotation around the z-axis is prevented or reduced by providing at least one flat, or non-circular, contact surface between the mounting components and their respective laminae stacks, making the perimeter of the lamina non-circular. In the embodiment of FIG. 10, the octagonal shape of the laminae series prevents rotation around the z-axis. The tolerances should be appropriate for the application to prevent excessive movement. For example, in the embodiment of FIG. 10, the tolerance between the mounting component 22 and the laminae stacks 16 is approximately $2/1000$ inches for applications such as mounting stereo speakers and other applications, as will be understood by one of ordinary skill in the relevant art.

Stacked laminae series are interleaved, preferably in an alternating fashion, such that when the series are compressed, the surfaces of each contact one another, creating static friction sufficient to prevent the series from moving relative to one another, thereby immobilizing the series relative to one another. The mounting components and any objects immovably mounted to the mounting components will also thereby be immobilized relative to one another.

The total stacked laminae can be as few as three or as many as desired. In the case of three laminae, the exterior laminae are also compressor laminae, as described below. The number of laminae necessary is determined by the surface area and physical nature of the laminae surfaces and the total static friction or holding strength desired.

Figure 24:
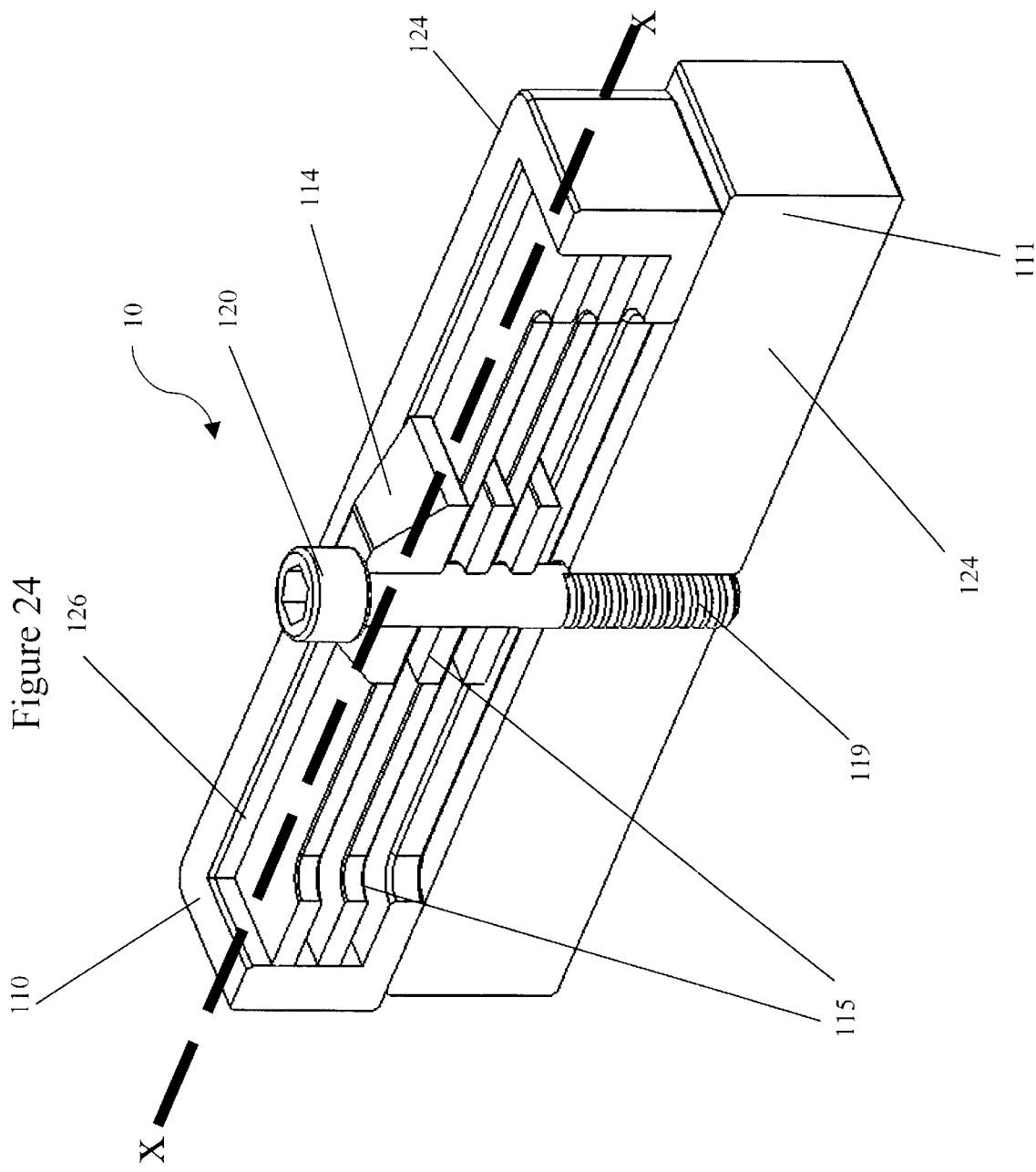
FIG. 24 is a cut-away perspective view of an adjustable mount assembly that embodies features of the present invention, in which the stacked laminae are platyplanar, rectangular, and with a guide.
Figure 25:
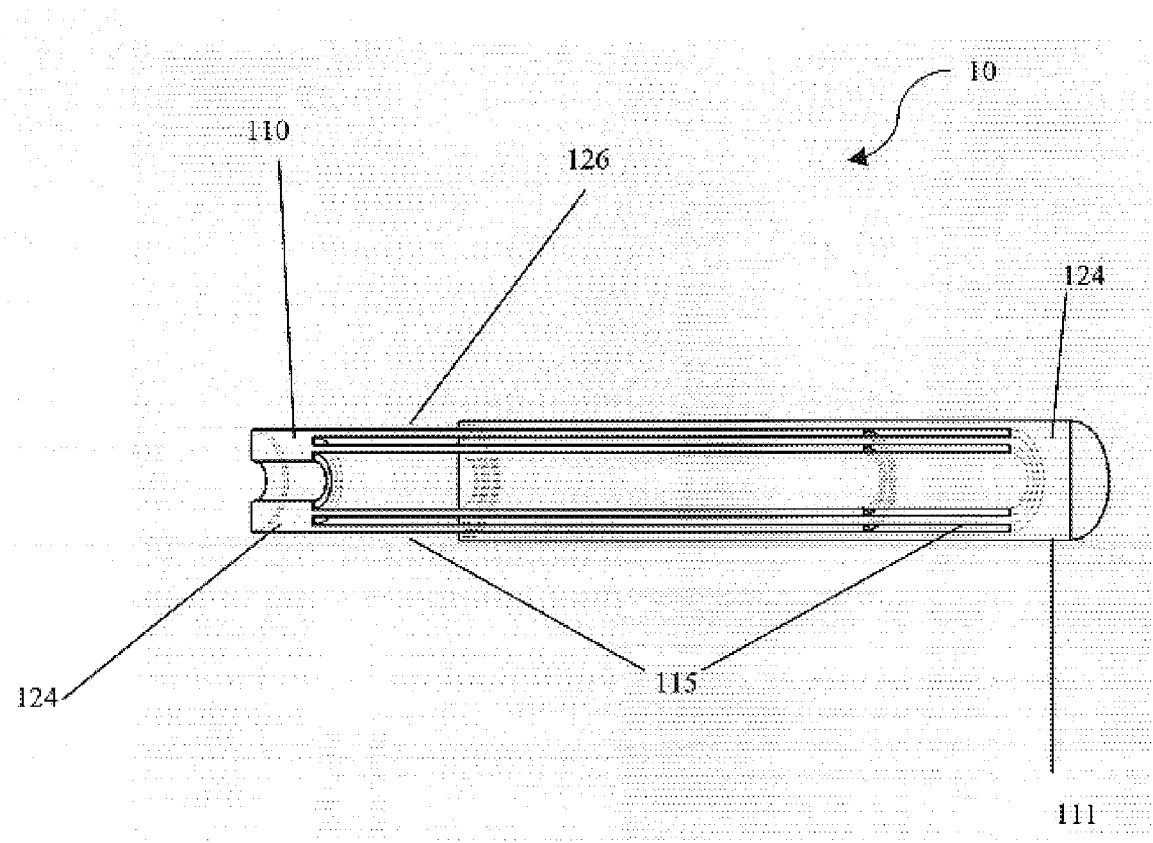
FIG. 25 is a side transparent view of an adjustable mount assembly that embodies features of the present invention, in which the stacked laminae are curviplanar in one dimension (semi-cylindrical).
Figure 26:
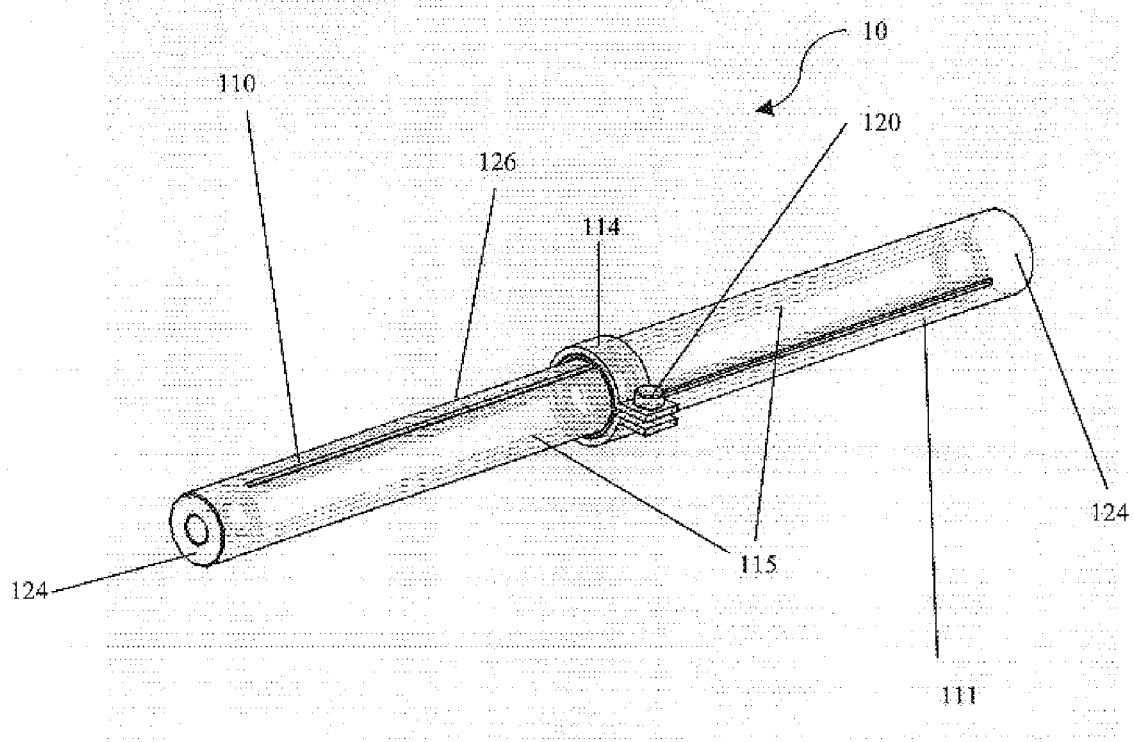
FIG. 26 is a transparent perspective view of another adjustable mount assembly that embodies features of the present invention, in which the stacked laminae are curviplanar in 1 dimension (fully cylindrical).
Figure 27:
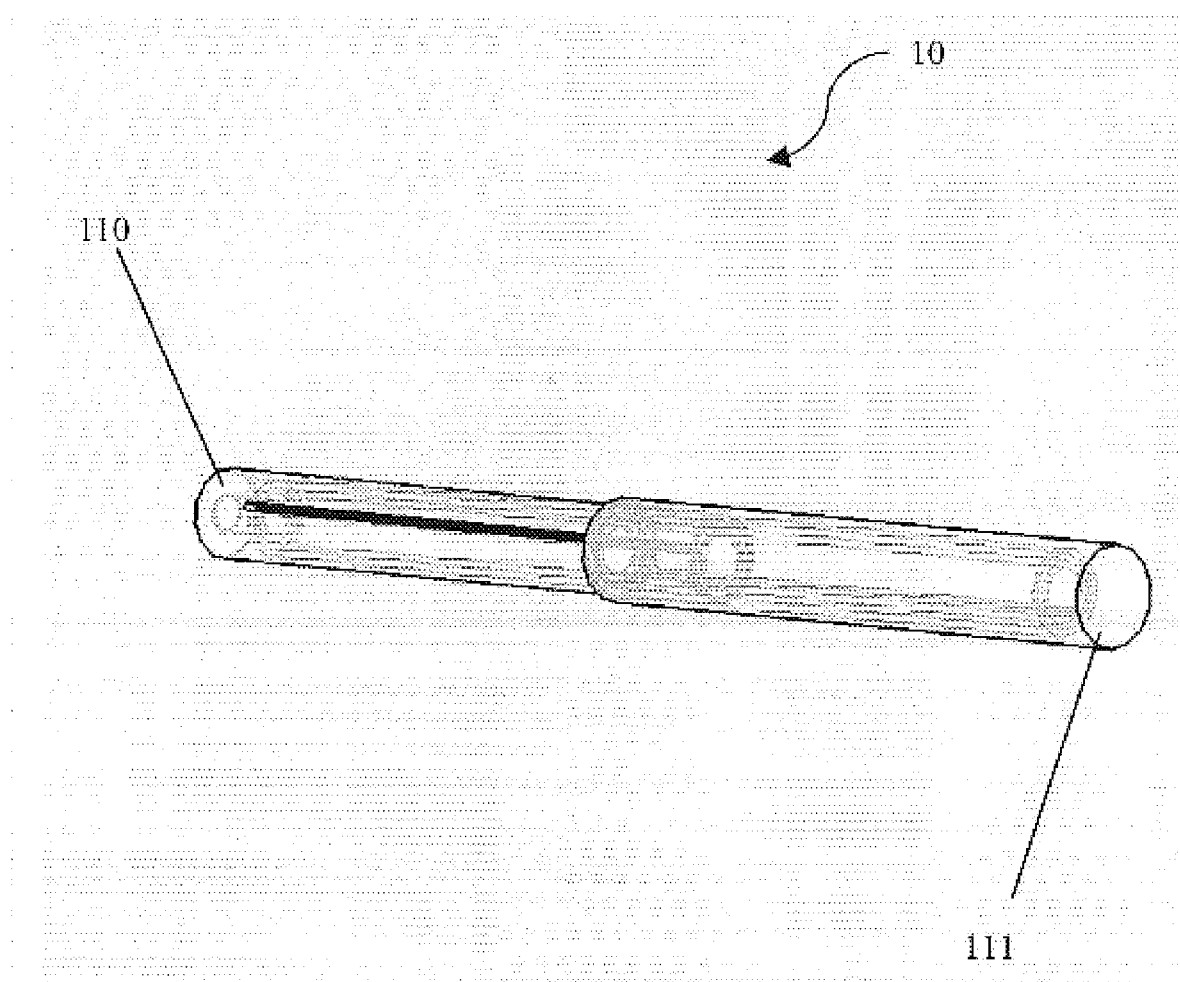
FIG. 27 is an assembled view of the adjustable mount assembly of FIG. 26 without the compression device in which the mounting components are partially telescoped together.
Figure 28:
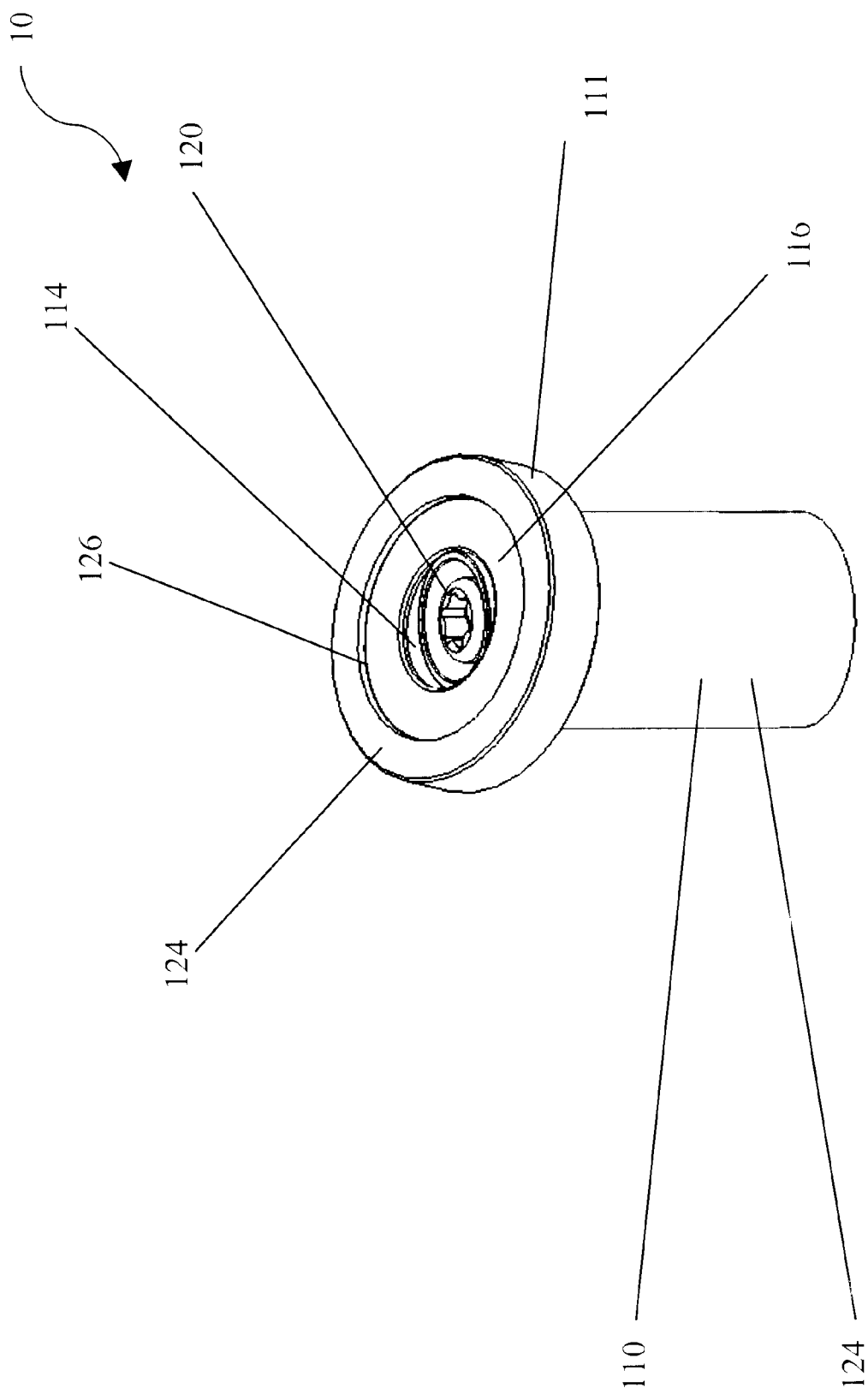
FIG. 28 is a perspective view of an adjustable mount assembly that embodies features of the present invention, in which the stacked laminae are curviplanar in two dimensions (semi-spherical).

The laminae can be a variety of planar shapes that permit them to slide with respect to one another when in close proximity to one another. The laminae may be flat planes, or platyplanar, as shown in FIGS. 13, 21, 22, 23, and 24, or curved planes, or curviplanar, as shown in FIGS. 25 through 31. The curviplanar laminae can be curved in one dimension, as shown in FIGS. 25 through 27, or in two dimensions, as shown in FIGS. 28 through 31.

Figure 12:
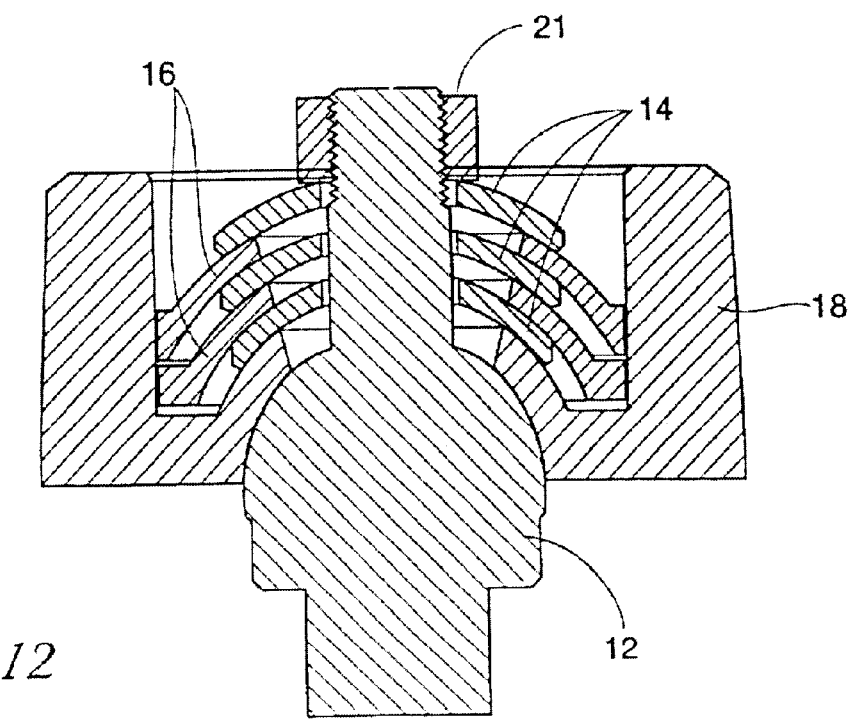
FIG. 12 is side sectional view of the assembled components of the system shown in FIG. 11.
Figure 13:
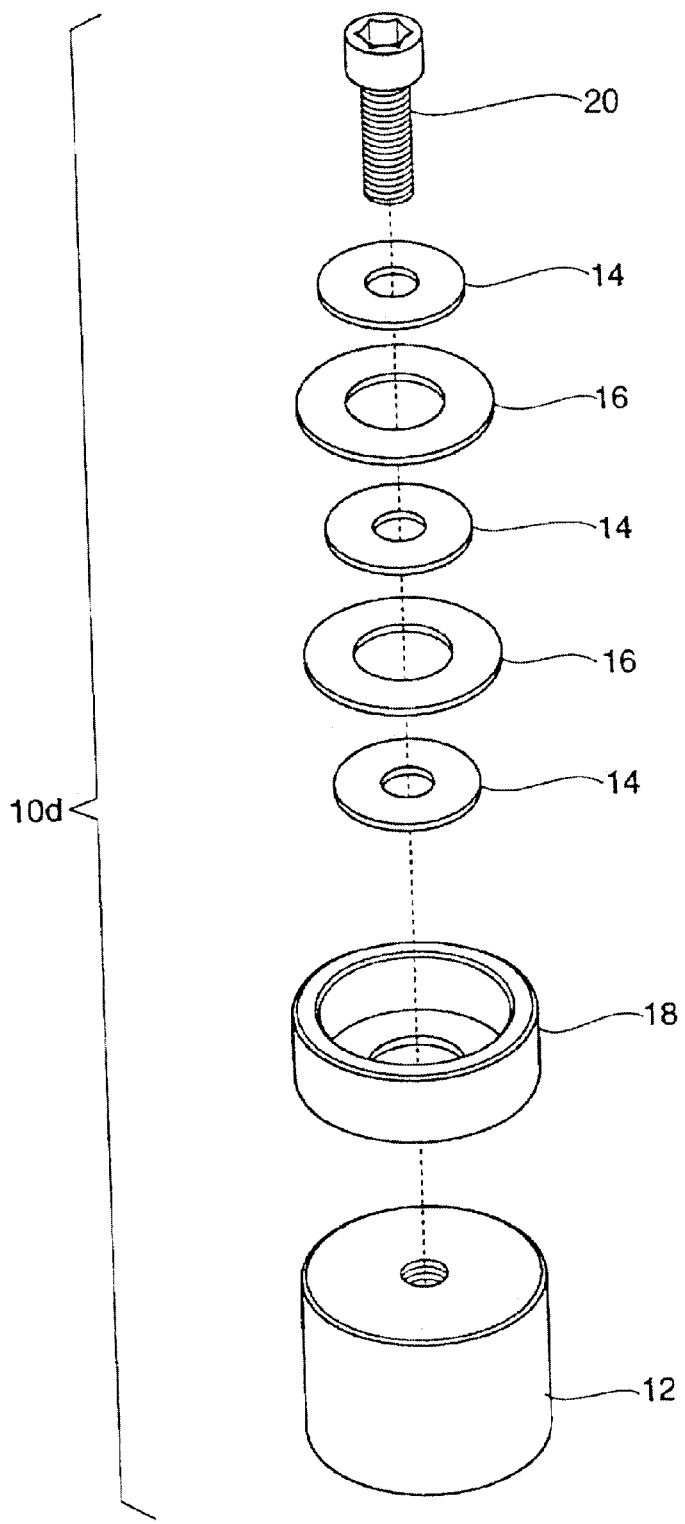
FIG. 13 is an exploded view of an alternative embodiment of an adjustable locking mount system that embodies features of the invention.

Platyplanar laminae restrict movement to translational movement in the x and y dimensions. Curviplanar laminae allow rotation around at least one axis. For example, when curviplanar laminae that are curved along the x-axis are moved along the x-axis, the laminae and mounting components rotate around the y-axis. Laminae that are curviplanar in both dimensions, as shown in FIGS. 1 through 12 28 through 31, that is along the x- and y-axes, form a semispherical shape and permit rotation around the x-, y-, and z-axes simultaneously. Circular platyplanar laminae, as shown in FIG. 13, also permit rotation around the z-axis.

The laminae surface characteristics can be varied to suit an application. For example, smooth surfaces on all laminae surfaces would allow the device to be finely adjusted by releasing the compression pressure only slightly. That is, the difference in separation between laminae between an immobile and mobile state is small with respect to other types of surfaces. Rough surfaces would require much greater separation of the laminae to allow an adjustment. Embodiments that have opposing surface that are rough, such as sandpaper, and deformable, such as plastics, would lock into place and would not slip without much greater separation than a comparable assembly with smooth surfaces. Such an assembly would therefore tend to remain locked in place with a larger release of the compression pressure and separation of the laminae. This characteristic would be desirable, for example, for devices that are subject to significant forces during use but are not frequently monitored.

Figure 22:
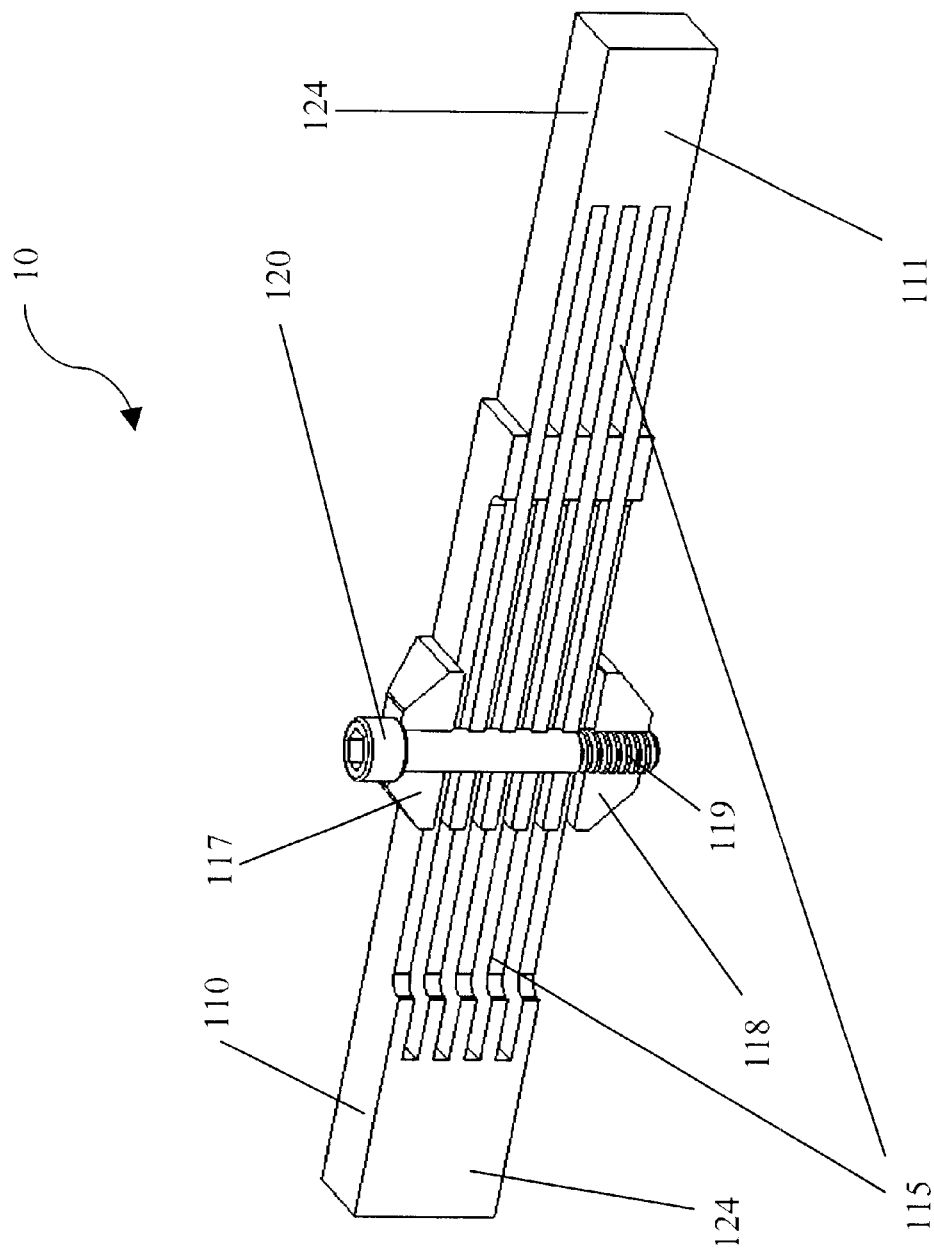
FIG. 22 is a cut-away side view of the adjustable mount assembly of FIG. 1.

The present invention also includes at least two compressor laminae 114. The compressor laminae 114 are positioned in opposition in a compressible arrangement, such that they compress the stacked lamina when the compression device is activated. Compressor laminae are distinguished from stacking laminae in that they are designed such that the compression forces are generally evenly distributed over the surface of the compressor laminae onto the stacked laminae. They may also include a mechanism that allows them to be forced together by a compression device. For example, as shown in FIGS. 21 and 22, the first compressor lamina 117 has a greater thickness and a smaller central hole than the stacking laminae to more evenly distribute the forces of compression exerted on it by the compression device 120 onto the laminae stacks. The second compressor lamina 118 is also similarly reinforced and includes a threaded portion (not shown) to receive the threaded end of a compressor device (119) such that the compression device 120 can force it towards or away from the first compressor lamina when the compression device is activated or released, respectively.

The functions of the compressor laminae may be integrated into one or more of the components of the assembly. For example, as shown in FIG. 24, the functions of one of the compressor laminae, compressor force distribution and opposition to the first compressor lamina, are performed by the second mounting component 111.

Alternately, the compressor laminae may be integrated into a single compressor lamina, as shown in FIG. 26. In this case, the single compressor lamina is able to perform the function of compressing the stacks because the stacks are curved into a cylinder.

Compression of the stacks is achieved by a compression device, shown as 20 in FIGS. 13 and 120 in FIGS. 21 through 26. The compression device exerts a force that forces the two compressor laminae together, compressing the stacks positioned between them.

A multitude of mechanisms can be used by the compression device to achieve this compression. For example, screw-based devices, ratchet-based devices, piston, spring-loaded, pneumatic or air-actuated, hydraulic devices and the like can be used to exert the compression force. Because the device is able to deliver a large amount of static friction per unit of compression pressure, the device can utilize compression mechanisms that may not be acceptable for other types of adjustable mounting devices because they do not deliver sufficient force.

The compression device can be external to the laminae or include an internal connector that connects the compressor laminae or their equivalent by passing through the laminae.

For example, a C-clamp or similar may be used as an external compression device. An example of a device with an internal connector is shown in FIG. 21. In this embodiment, the compression device 120 is an internal bolt slipped through a first compressor lamina 114 and threaded into the second compressor lamina 114. The internal bolt can be turned to force the two compressor laminae together, thereby compressing the intervening stacks 115 and 116.

As demonstrated in FIG. 21, an internal connector compression device requires that the stacking laminae have a hole that allows the bolt to pass through. To achieve relative linear movement of the two mounting components, this hole is enlarged in the dimension of the desired movement in at least one of the laminae series to allow the laminae and mounting components to slide along this axis of movement.

Figure 29:
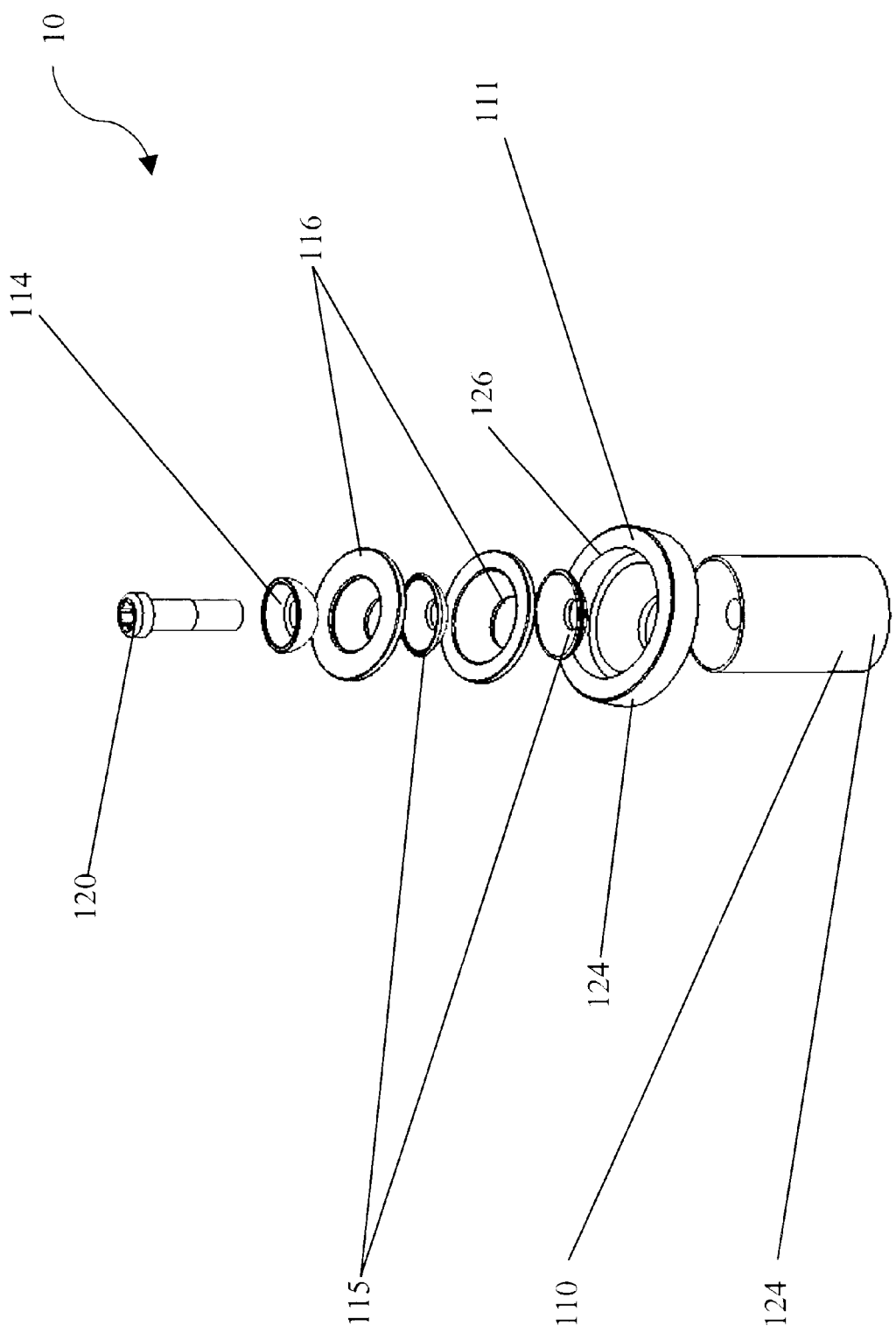
FIG. 29 is an exploded view of FIG. 28.
Figure 30:
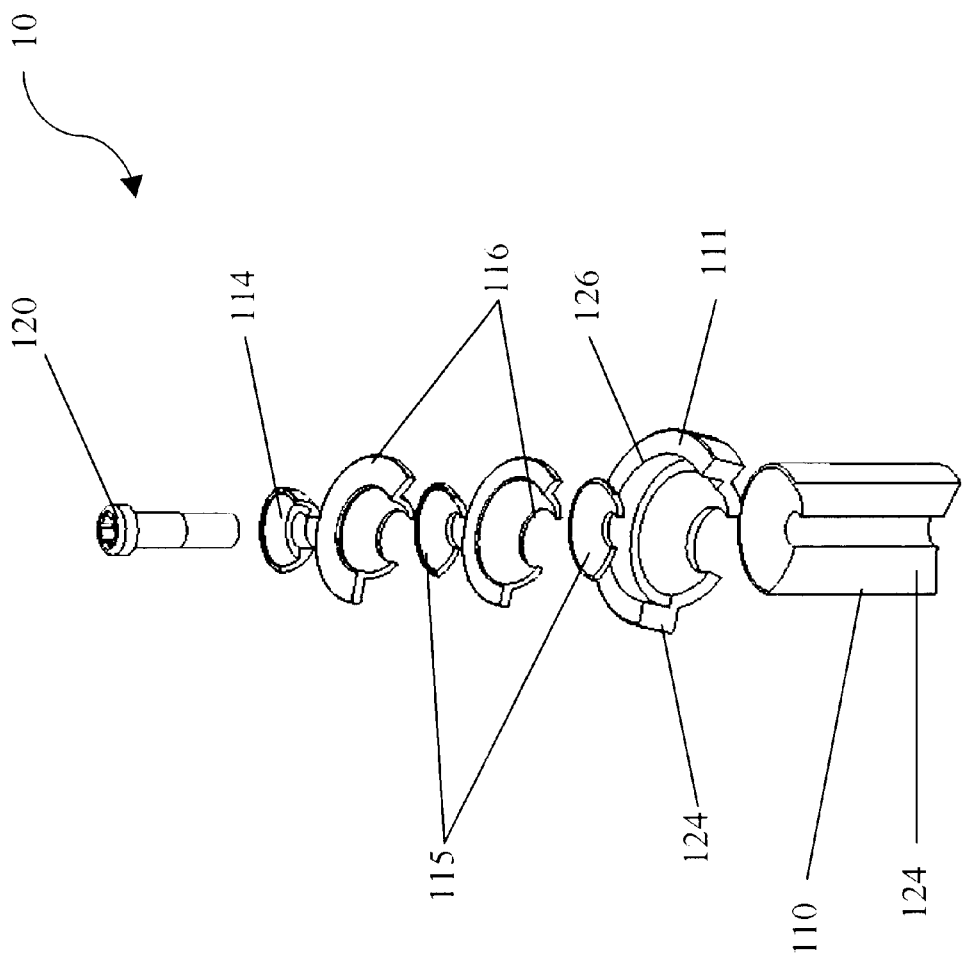
FIG. 30 is a cut-away view of FIG. 29.
Figure 31:
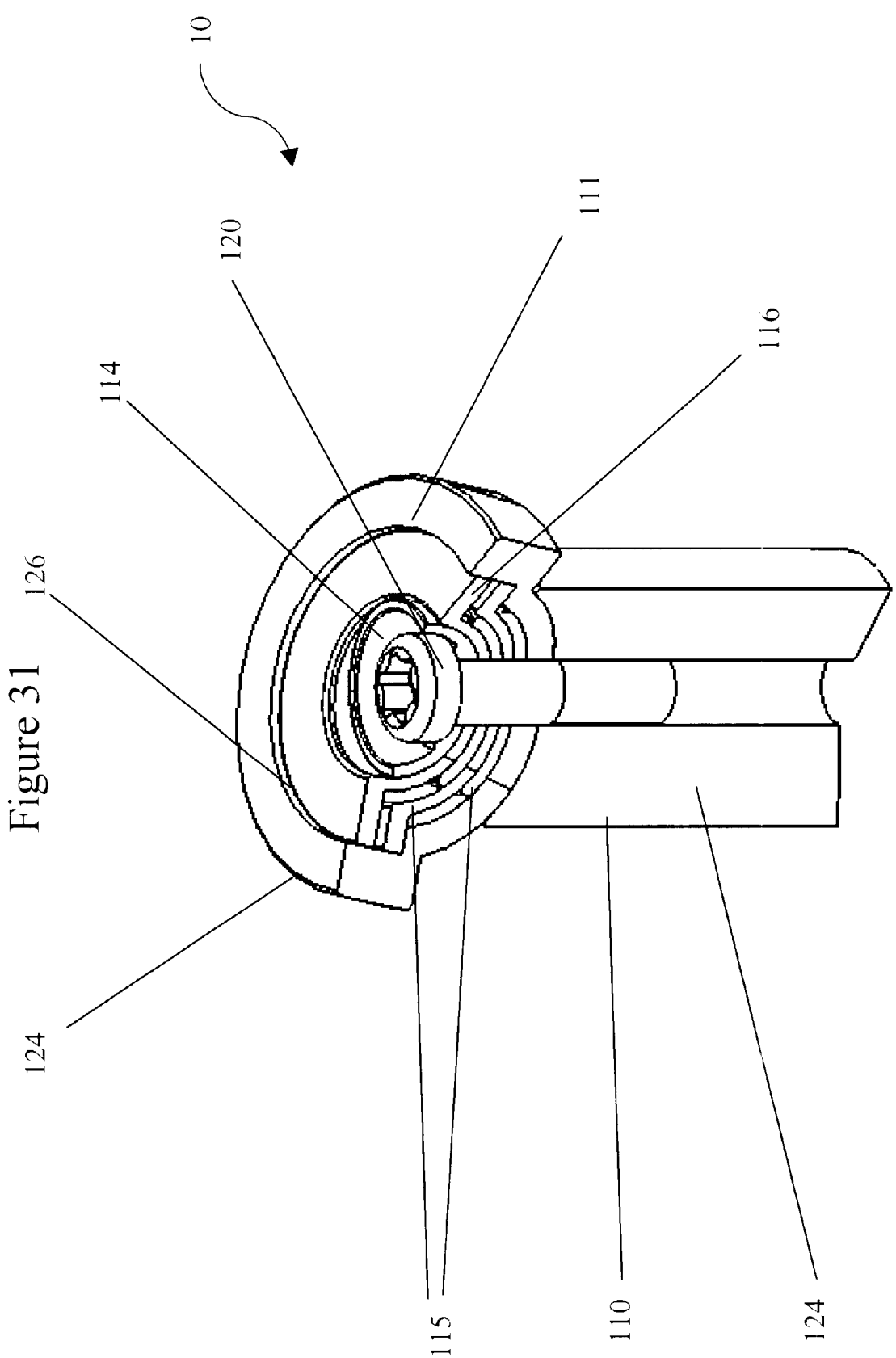
FIG. 31 is an assembled view of FIG. 30.

In the case of multi-axial translation or movement, that is, translation along more than one axis of the laminae plane, as can occur in the embodiment shown in FIG. 29, the holes in the stacked laminae associated with the second component 116 are enlarged in all the dimensions necessary to allow the internal bolt to move through the desired range of movement. In this example the hole is enlarged along 360 degrees.

The device may further include a guidance mechanism or guide to keep the laminae stacks in a certain alignment relative to one another. For example, as seen in FIG. 24, the first component 110 includes a side barrier 126 that functions as a guide to keep the laminae stacks of the first and second component aligned along the axis of movement X—X. This guidance mechanism may also be integrated into the mounting component, as shown in FIGS. 24 through 31.

Alternatively or additionally, the guidance mechanism may be integrated into the stacked laminae. For example, in an assembly in which relative component movement is limited to translation along a single axis, the laminae can incorporate a design, such as a nested tongue-in-groove design in which each lamina contains a tongue feature on one side and a corresponding or complementary groove feature on the opposite side, such that the laminae stack in a complementary manner with both adjacent laminae, and the tongues and grooves are oriented parallel to the axis of translation to permit translation along that axis.

Figure 34:
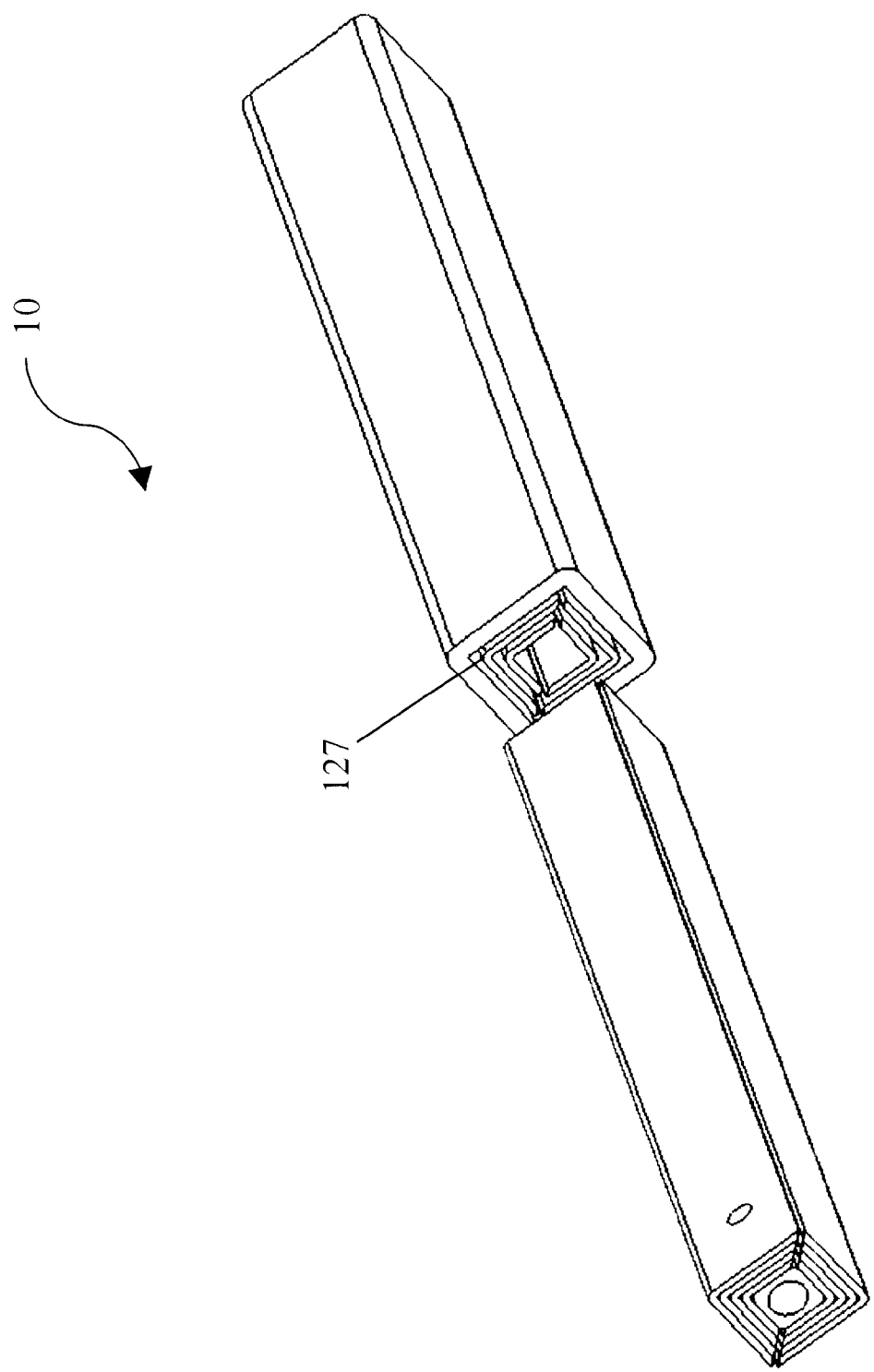
FIG. 34 is a perspective disassembled view of one series of stacked laminae according to the present invention.

Structural rigidity and strength can also be integrated into the laminae via alternative designs. For example, the laminae may include a longitudinal fold 127 or ridge, as shown in FIG. 34, to provide strength along the translation axis of the stacks. This design example utilizes the increased bending resistance and/or stiffness conferred by the incorporation of an angle, an arch, planar discontinuity or other stackable surface relief into the laminae to provide more structural rigidity and strength to the assembly. The longitudinal fold may be a single longitudinal fold or a multiplicity of longitudinal folds.

An assembly according to the present invention provides an adjustable mount with low torque and compression pressure needed to immobilize it because of the high static friction generated by the interleaved stacks. Such a system, which provides high static friction per unit compression pressure, is advantageous for several reasons. Because the present invention generates a high holding strength per unit compression pressure, lower compression pressures are used, thereby causing no permanent deformation of components to achieve holding strength. The static friction generated per unit torque is greater than the possible errant torque applied, thereby allowing the assembly to be immobilized prior to the exertion of high torque, which prevents slipping of the components relative to one another if the torque applied is not applied in a balanced, symmetrical manner. Also, because the present invention has a high holding strength per unit volume, devices according to the present invention are more compact relative to prior art embodiments.

Thus, the invention provides a multi-laminae adjustable mount assembly device composed of at least two mounting components, each with a mounting area, a respective series of stacked, compressible laminae, at least two compressor laminae compressible in opposition, and a compression device; wherein the stacked laminae series are interleaved and the compression device compresses the stacked, interleaved laminae, and the relative movement of the at least two mounting components is permitted in at least one of the three axes of movement when the laminae series are in an uncompressed state. Such a system provides an adjustable mount assembly that has a high holding strength per unit of compression pressure, high holding strength per unit of mass and volume, low immobilization compression pressure, and causes no permanent deformation of compressed components to achieve holding strength.

DESIGN EXAMPLE(S)

The following section sets forth a few preferred embodiments illustrative of an adjustable mounting system according to the present invention.

Figure 2:
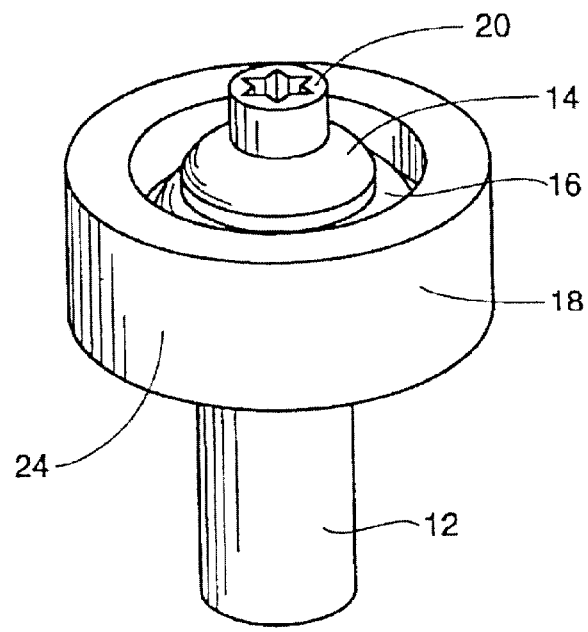
FIG. 2 is an assembled perspective view of the system shown in FIG. 1.
Figure 3A:
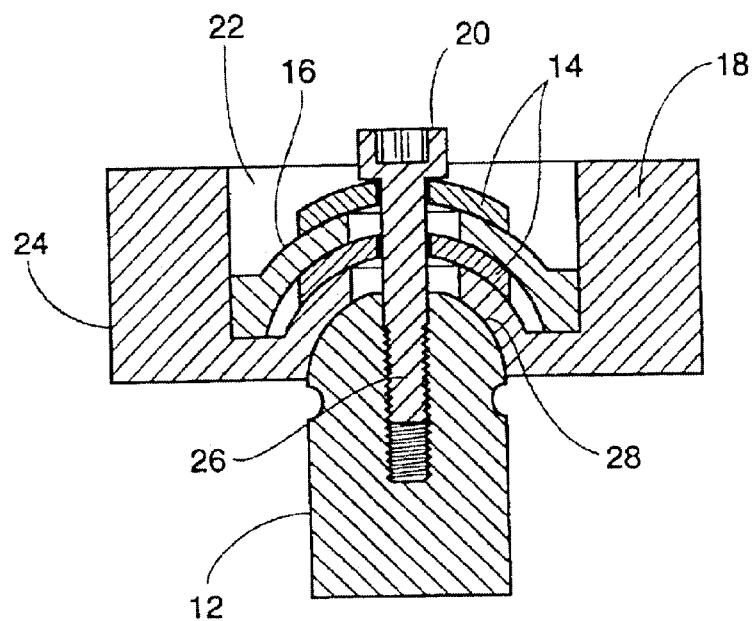
FIG. 3a is a side sectional view of the assembled components of the system shown in FIG. 2.

I. The Adjustable Locking Mount System
A. System 1: Interior Hub Centrally Located with Respect to Mounting Surface FIG. 1 shows the individual components of an adjustable locking mounting system 10A. FIGS. 2 and 3a illustrate the system 10A when assembled. As will be described in detail later, the system 10A permits adjustment in three directions or three degrees of freedom (rotational around axes x, y, and z, where the z-axis is represented by the axis of the pivot pin 12) (see FIGS. 4a–4e). The system 10A comprises the pivot pin 12, at least one slip washer 14, at least one lock washer 16, a mounting hub 18, and a locking screw 20. Each of these components of the system 10A will now be described in detail.

1. System Components

As seen in FIG. 1, the pivot pin 12 is a rigid, generally cylindrical or rod-like member. The pivot pin 12 is convex, e.g., domed, at one end to couple with the mounting hub 18 (see, e.g., FIG. 3a). In a representative embodiment, the arc of curvature is 0.400" diameter (0.200" radius).

In particular, the convex arrangement permits adjustment of the mounting hub 18 by swinging or tilting across the axis of the pivot pin 12 (i.e., rotation about the x-axis and y-axis) as well as by rotating or twisting about the axis of the pivot pin 12 (i.e., rotation about the z-axis) (see FIGS. 4a–4e).

As best seen in FIGS. 1 and 3, the pivot pin 12 has a threaded central bore 26 that serves to receive the locking screw 20. Thus, the pivot pin 12 serves to receive both the mounting hub 18 and the locking screw 20 (see FIG. 3a).

The pivot pin 12 can be made of suitable metal, plastic, or ceramic materials and formed by conventional molding or machining techniques.

As shown in FIG. 1, the mounting hub 18 is a rigid member comprising a mounting surface 24, an interior hub 22, and an exterior pivot surface 28. The center of the mounting hub 18 serves to receive the locking screw 20.

The mounting surface 24 is configured to mate with an object or device being mounted on the hub and therefore can take on a variety of shapes. Thus, the mounting hub 18 serves as a base for mounting of another object or device. For example, the mounting surface 24 can be circular or geometric. In the illustrated embodiment, the mounting surface 24 is generally circular.

Additionally, the mounting surface 24 can be stepped to further aid in positioning and securing the object or device on the mounting surface 24 (not shown). In this arrangement, the object or device being mounted would have a complementary stepped surface. The stepped surface provides greater control of any adjustment by permitting adjustment to be in uniform increments and reducing the risk of inadvertent movement. The mounting surface 24 could alternatively be a threaded surface to facilitate engagement with a mating part.

As best illustrated in FIG. 1, the interior hub 22 is open. The bottom surface of the interior hub 22 is configured to conform to the shape of the convex end of the pivot pin 12 and sized to receive the slip washer(s) 14 and lock washer(s) 16. That is, the interior hub 22 permits a slip washer 14 and lock washer 16, or multiple slip washers 14 and lock washers 16, to be alternately stacked upon one another (see FIG. 3a).

As shown in FIGS. 1–3a, the exterior pivot surface 28 of the mounting hub 18 is configured to nest on and to conform to the convex end of the pivot pin 12, thus permitting a wider range of motion, as previously described.

As best seen in FIG. 3a, the exterior pivot surface 28 is located centrally with respect to the interior hub 22. Further, the interior hub 22 is centrally located with respect to the mounting surface 24, such that the geometric center of the mounting hub 18 coincides with the center of rotation of the mounting hub 18 about the pivot pin 12.

The mounting hub 18 serves to engage and pivot about the pivot pin 12, thus permitting adjustment of the position of the mounting hub 18 with respect to the pivot pin 12, as will be described later. Upon obtaining the desired position, the position of the mounting hub 18 can be locked by use of the locking screw 20, as will also be described in greater detail later.

The mounting hub 18 can be made of any suitable metal or plastic and formed by conventional machining or molding techniques.

As shown in FIG. 1, the system 10A also provides at least one slip washer 14. The slip washer 14 is preferably a rigid annular ring or doughnut-like member. As FIGS. 1 and 3a best show, the slip washer 14 is configured to conform to the bottom surface of the interior hub 22.

The center of the slip washer 14 serves to receive the locking screw 20. The center of the slip washer 14 is of a diameter only slightly larger than the outside diameter of the locking screw 20. The slip washer 14 also serves to provide a frictional surface, which upon tightening of the locking screw 20, serves to further secure the mounting hub 18 in a desired position.

Figure 5A:
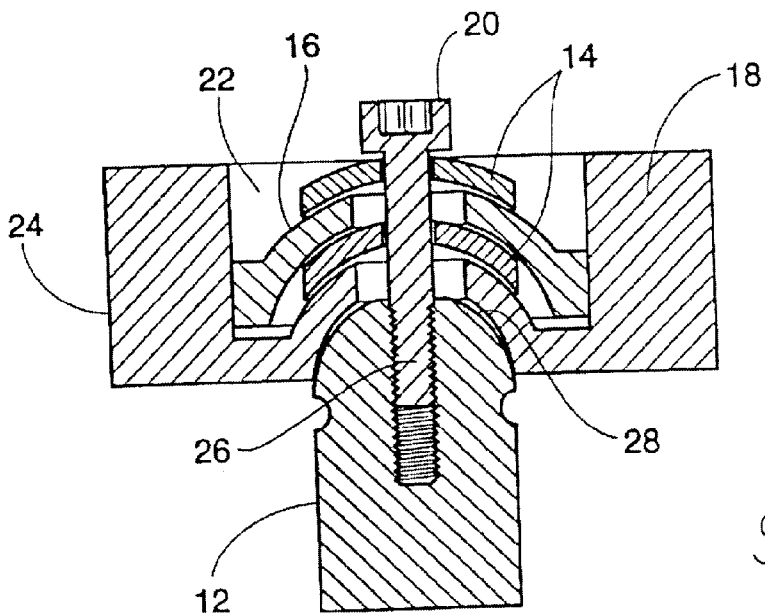
FIG. 5a is a side sectional view of the assembled components of the system shown in FIG. 3 and illustrating the system components in a level position.
Figure 5B:
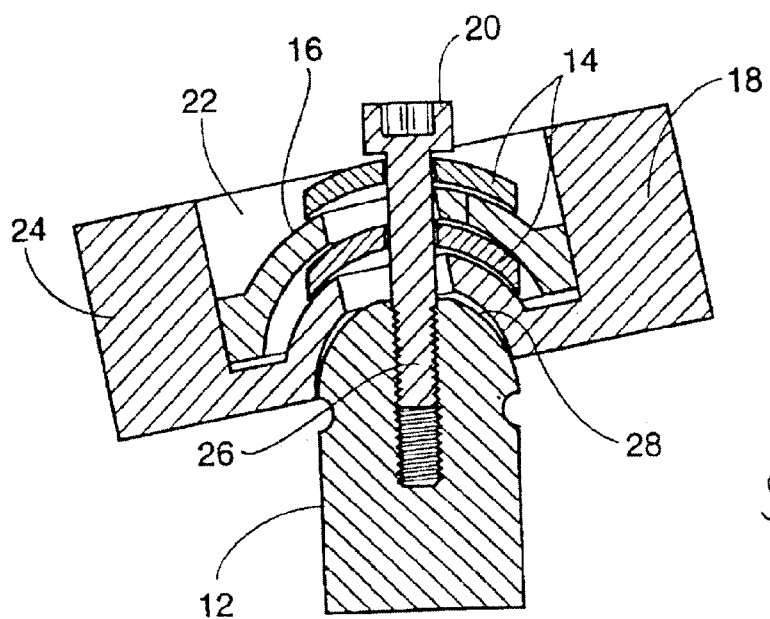
FIG. 5b is a sectional view as shown in FIG. 5a, illustrating the position of the system components and the movement of the mounting hub and lock washer when the mounting hub is rotated about the x or y-axis.

The slip washer 14 permits the lock washer 16 to slide across the surface of the slip washer 14 (see FIGS. 5a and 5b). The slip washer 14 is similar in function yet physically different in top and bottom spherical radii from the lock washer 16.

Figure 3B:
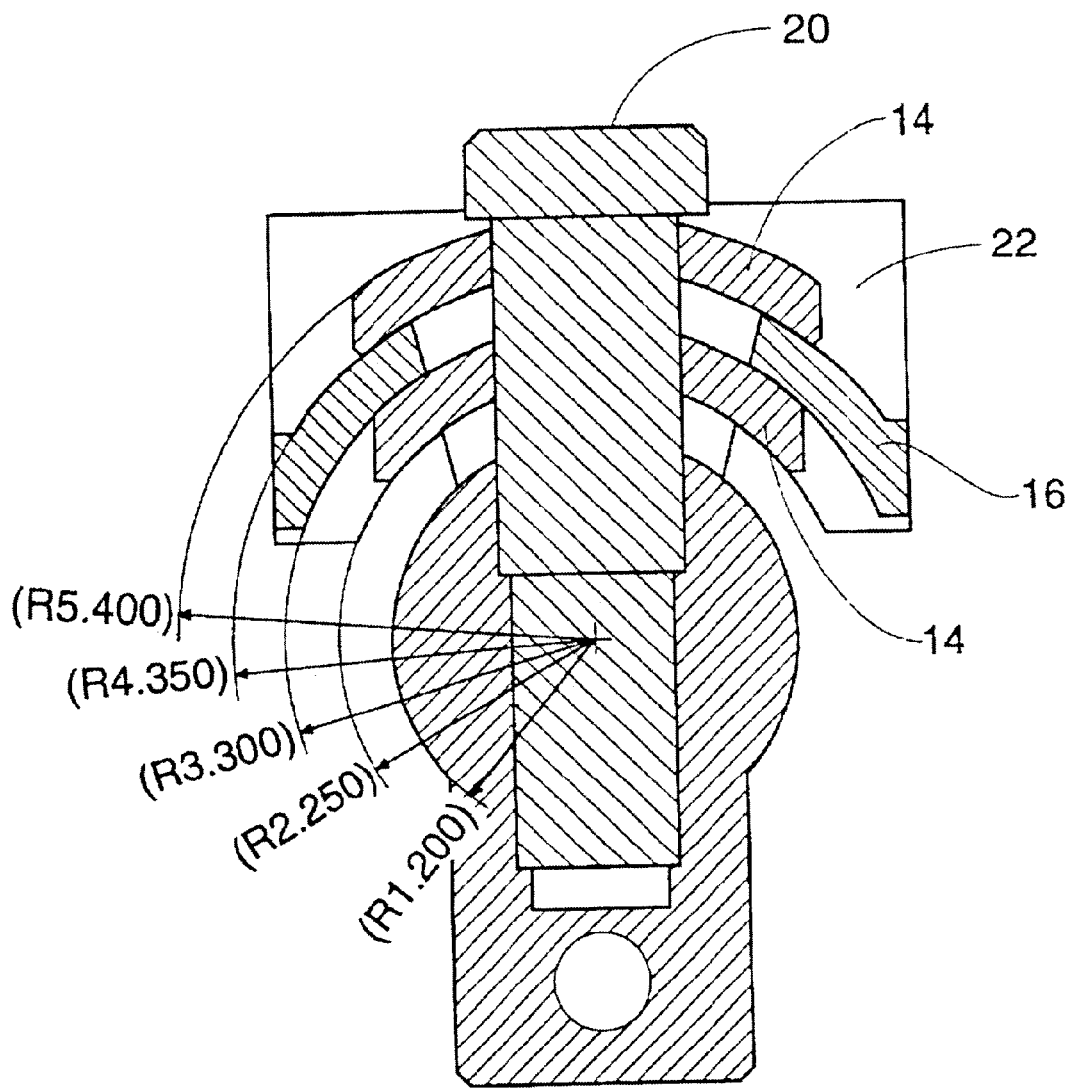
FIG. 3b is a view similar to FIG. 3a and illustrating the spherical radii of the stacked washers.

As seen in FIG. 3b, additional washers 14 and 16 in the assembly would also have different spherical radii, represented by R1–R5 in FIG. 3b, as they are stacked further from the center of rotation or pivot point on the pivot pin 12. In a representative embodiment, R1 is 0.200, R2 is 0.250, R3 is 0.300, R4 is 0.350, and R5 is 0.400.

The radii of the washers 14 and 16 can be varied to accommodate the thickness of the individual washers 14 and 16. Regardless of the thickness or radii of the washers 14 and 16, the washers 14 and 16 are configured to rotate about the same pivot point.

Desirably, as illustrated in FIGS. 1 and 3a, a second slip washer 14, similar in function but differing in spherical radii from the first slip washer 14 is placed over the lock washer 16. As illustrated in FIGS. 5a and 5b, the lock washer 16 is able to slide between the slip washers 14.

In this arrangement, the second slip washer 14 provides an additional frictional surface, which upon tightening of the locking screw 20, serves to further secure the desired position.

The slip washer(s) 14 can be made of any suitable metal or plastic and formed by conventional machining or molding techniques.

As also seen in FIG. 1, the system 10A further provides a lock washer 16. The lock washer 16 is a rigid, annular ring or doughnut-like member similar to the slip washer 14.

As FIGS. 1 and 3a best illustrate, the lock washer 16 is configured to conform to the surface of the slip washer 14. This arrangement permits the lock washer 16 to be stacked on top of the slip washer 14.

As in the case of the slip washer 14, the center of the lock washer 16 serves to receive the locking screw 20. The center of the lock washer 16 is also sized larger than the center of the slip washer 14. That is, the center of the lock washer 16 not only serves to receive the locking screw 20, but also permits the lock washer 16 to pivot about the pivot pin 12.

The lock washer 16 also provides two additional frictional surfaces when sandwiched between two slip washers 14, which upon tightening of the locking screw 20, serve to further secure the desired position.

As also seen in FIGS. 1 and 3a, the lock washer 16 is of a larger diameter than the slip washer 14. This arrangement allows the lock washer 16 to fit over the slip washer 14. In a representative embodiment, the lock washer 16 is sized to approximate or be slightly less than the diameter of the interior hub 22, thereby providing a secure fit of the lock washer 16 within the interior hub 22 and allowing only minimal translation in the x and y axes, yet not restricting z-axis translation of the lock washer 16 within the interior hub 22 and with respect to the axis of the pivot pin 12, as will later be described in detail.

This arrangement secures/couples the lock washer 16 to the interior hub 22 and permits the lock washer 16 to slide with the mounting hub 18 over the slip washer 14 (see, e.g., FIGS. 5a and 5b). Thus, the lock washer 16 serves to provide an additional rotational and rocking surface for the mounting hub 18.

Like the slip washer 14, the lock washer 16 can be made of any suitable plastic or metal and formed by conventional molding or machining techniques.

Desirably, as previously noted, a second slip washer 14 similar in function but differing in spherical radii from the first slip washer 14 can be provided. In this arrangement, as seen in FIGS. 1 and 3a, the lock washer 16 also serves to receive the second slip washer 14. It will be apparent that any number of slip washers 14 and lock washers 16 can be similarly alternately stacked upon each other and thereby accommodate variations in the depth of the interior hub 22.

As also shown in FIG. 1, the system 10A provides a locking screw 20. The locking screw 20 is a screw that is adapted for passage through the mounting hub 18, the slip washer(s) 14, the lock washer(s) 16, and the pivot pin 12 when the system is assembled (see FIG. 3a). In inside the diameter of the slip washer 14 is sized to approximate or be slightly larger than the diameter of the locking screw 20. This arrangement secures/couples the slip washer 14 to the locking screw 20 and the pivot pin 12.

Figure 5C:
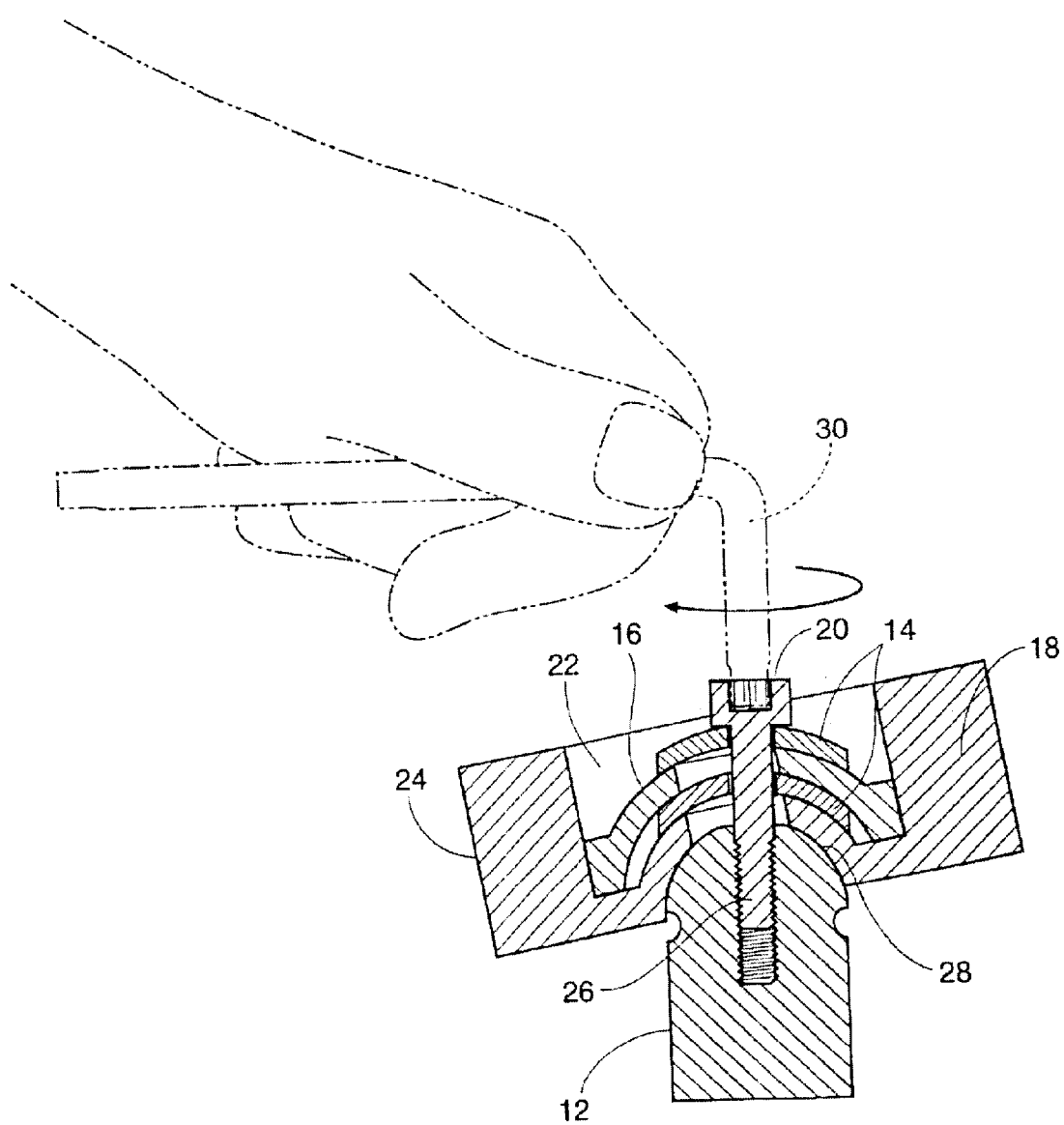
FIG. 5c is a sectional view as shown in FIG. 5b, illustrating the procedure of locking the system in a desired position.

As illustrated in FIG. 3a, the locking screw 20 is desirably threaded to fit the threaded bore 26 of the pivot pin 12. As FIG. 5c illustrates, rotation (represented by arrow in FIG.

5c) of the screw 20, e.g., by an Allen wrench 30, advances the screw into the pivot pin 12 to fix the mounting hub 18 in a desired position. The locking screw 20 can be made of any suitable plastic or metal and formed by conventional molding or machining techniques.

The locking screw 20, when not fully tightened, serves to hold the assembly while the desired position is determined. Tightening of the locking screw 20 compresses the washers 14 and 16, hub 18, and pin 12 together, thereby creating multiple frictional forces between the mating surfaces. These frictional forces and the compression of the screw 20 are what limit movement in the locked position.

It will be apparent that the components just described can be used in any combination. For example, plastic slip washers 14 may be alternated with metal lock washers 16.

2. Adjustment of the Orientation of the Mounting Hub

The system 10A as previously described enables the mounting hub 18 to be oriented in a variety of directions with respect to the pivot pin 12. The types of movement, and thus the types of adjustments permitted, will now be discussed.

The system 10A permits movement of the mounting hub 18 in at least three rotational directions.

Figure 4A:
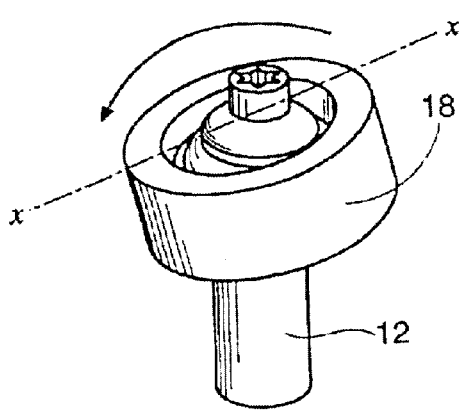
FIGS. 4a–4e illustrate rotational movement of the cooperating components of the assembled system shown in FIG. 2.
Figure 4B:
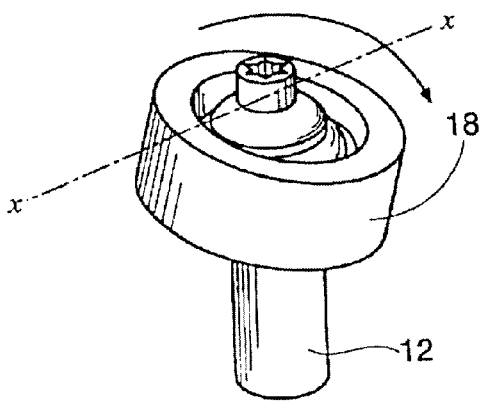

First, as represented by arrows in FIGS. 4a–4b, the mounting hub 18 can be rocked or rotated, i.e., tilted, about the x-axis (i.e., side to side rotation). This motion is permitted by the convex surfaces of the pivot pin 12, mounting hub 18, slip washer(s) 14, and lock washer(s) 16.

Figure 4C:
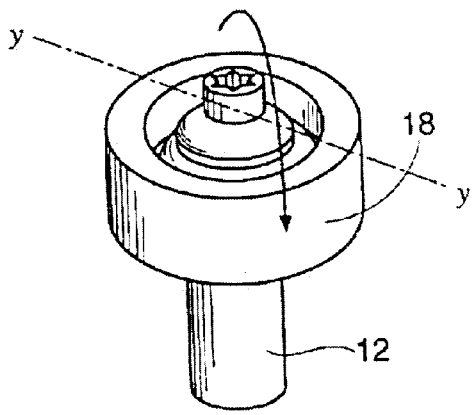
Figure 4D:
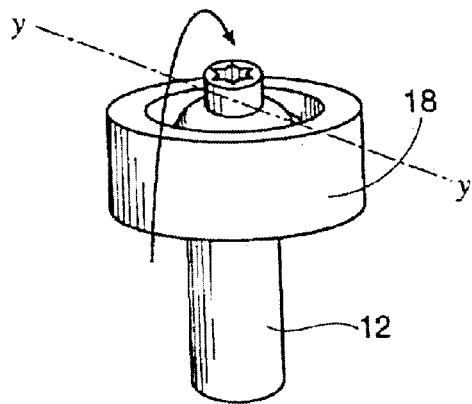

Second, as represented arrows in FIGS. 4c–4d, the mounting hub 18 can be rocked or rotated, i.e., tilted, about the y-axis (i.e., front to back rotation). This motion is permitted by the convex surfaces of the pivot pin 12, mounting hub 18, slip washer(s) 14, and lock washer(s) 16.

Figure 4E:
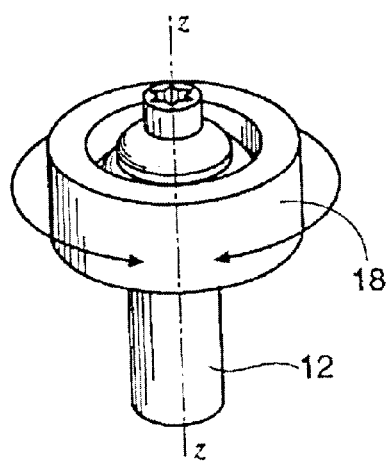

Third, as represented by arrows in FIG. 4e, the mounting hub 18 can be rotated 360.degree. in either a clockwise or counterclockwise direction about the z-axis (i.e., axis of the pivot pin 12).

It is to be understood that the rotational and rocking movements permit adjustment in virtually an infinite number of rotational directions.

B. System 2: Interior Hub Eccentrally Located with Respect to Mounting Surface

1. System Components

Figure 6:
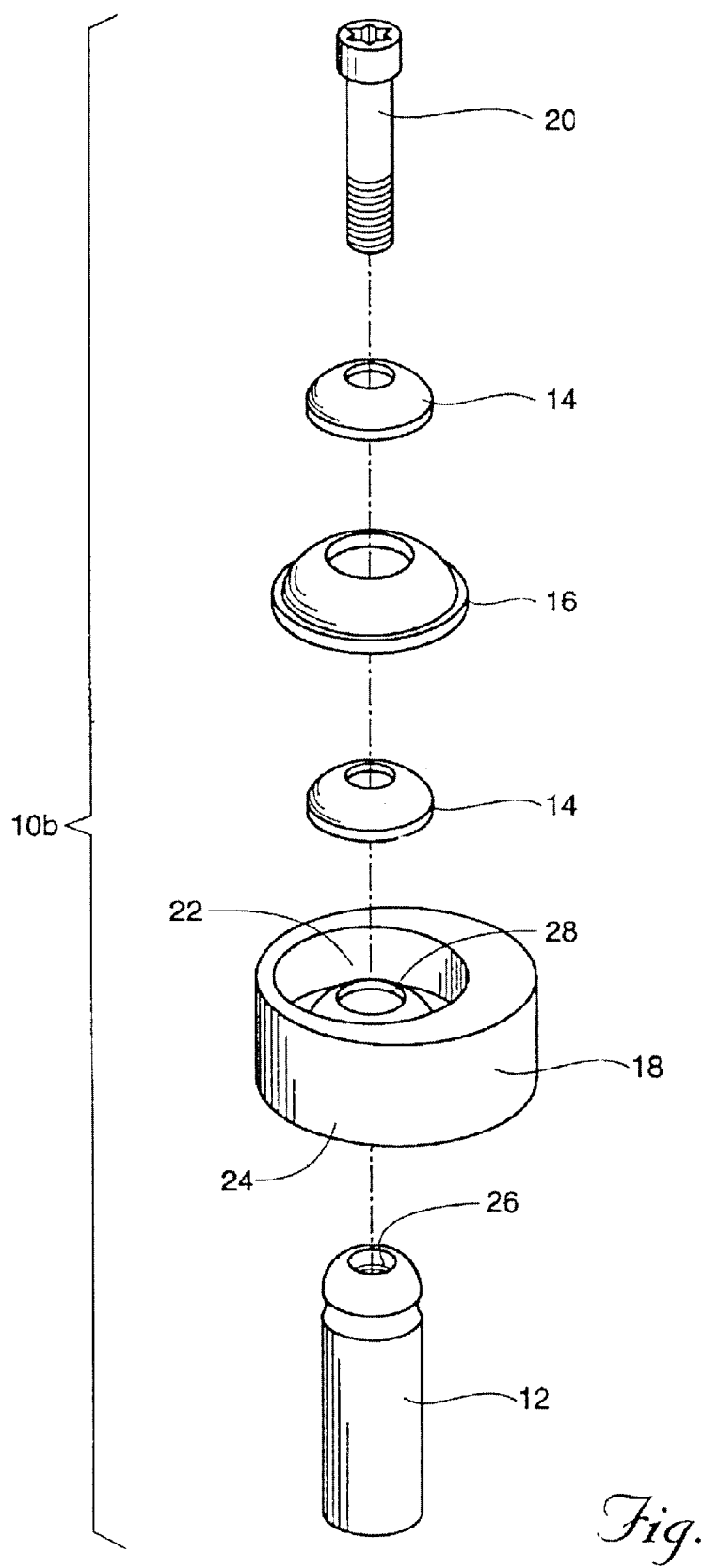
FIG. 6 is an exploded view of the components of an alternative embodiment of an adjustable locking mount system that embodies features of the invention, in which the mounting hub is eccentric.
Figure 7:
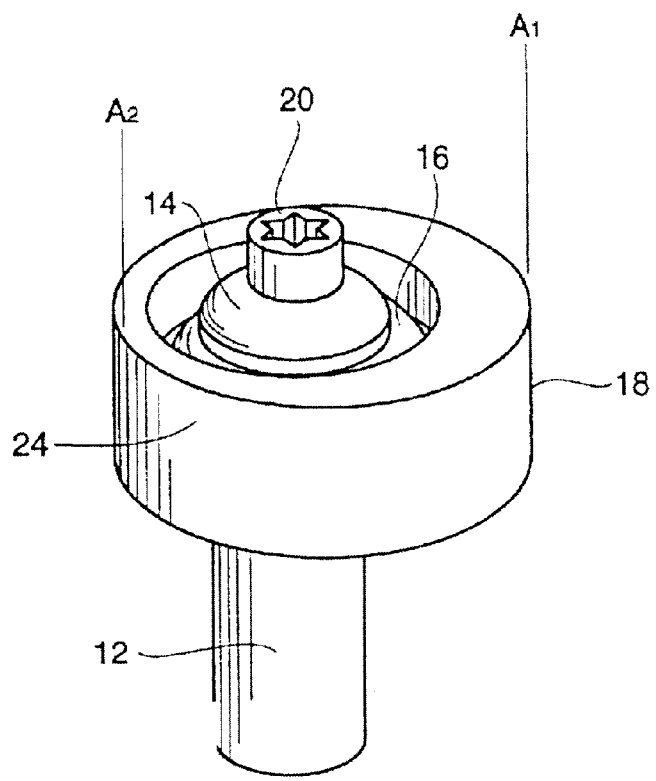
FIG. 7 is an assembled perspective view of the system shown in FIG. 6.
Figure 8:
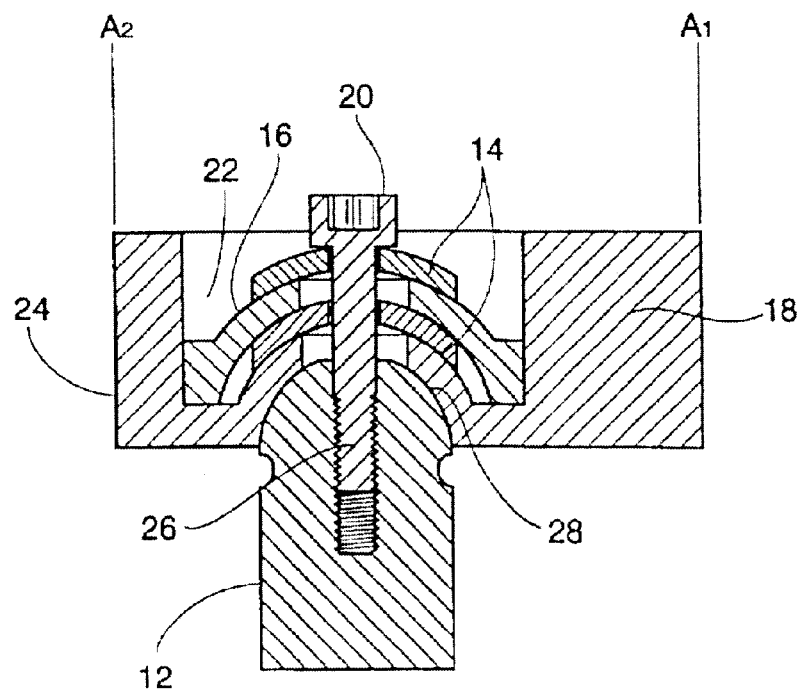
FIG. 8 is side sectional view of the assembled components of the system shown in FIG. 7.

FIG. 6 shows the individual components of an alternative system 10B providing an adjustable locking mount system. FIGS. 7 and 8 illustrate the system 10B when assembled.

Like system 10A, the system 10B comprises a pivot pin 12, at least one slip washer 14, at least one lock washer 16, a mounting hub 18, and a locking screw 20.

Also like system 10A, the mounting hub 18 has an exterior pivot surface 28 that is located centrally with respect to the interior hub 22. In this embodiment, as FIGS. 6–8 best show, the interior hub 22 is eccentric with respect to the mounting surface 24, such that the geometric center of the mounting hub 18 does not coincide with the center of rotation of the mounting hub 18 about the pivot pin 12. The eccentric configuration permits a broader range of adjustment.

2. Adjustment of the Orientation of the Mounting Hub

The system 10B as previously described enables the mounting hub 18 to be oriented in a variety of directions with respect to the pivot pin 12. The types of movement, and thus the types of adjustments permitted, will now be discussed.

The system 10B permits movement of the mounting hub 18 in at least five directions.

Figures 9A, 9B:
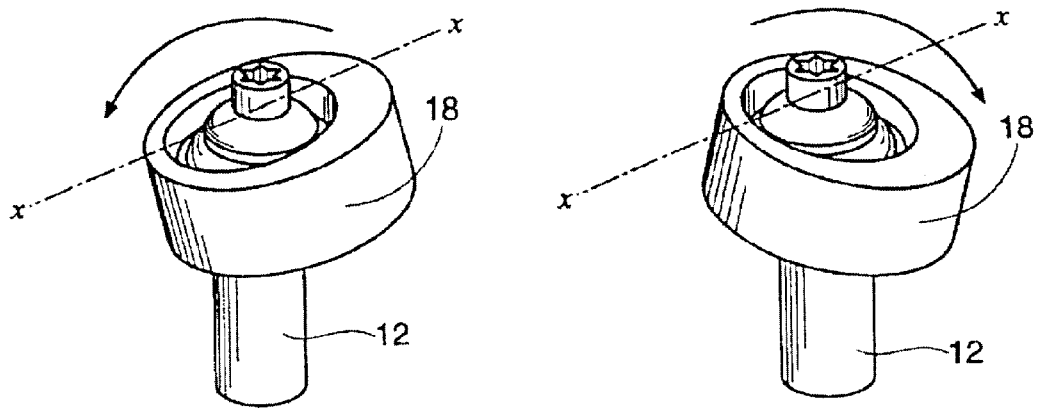
FIGS. 9a–9e illustrate rotational movement of the cooperating components of the assembled system shown in FIG. 7.

First, as represented by arrows in FIGS. 9a–9b, the mounting hub 18 can be rocked or rotated about the x-axis, as previously described for system 10A.

Figures 9C, 9D:
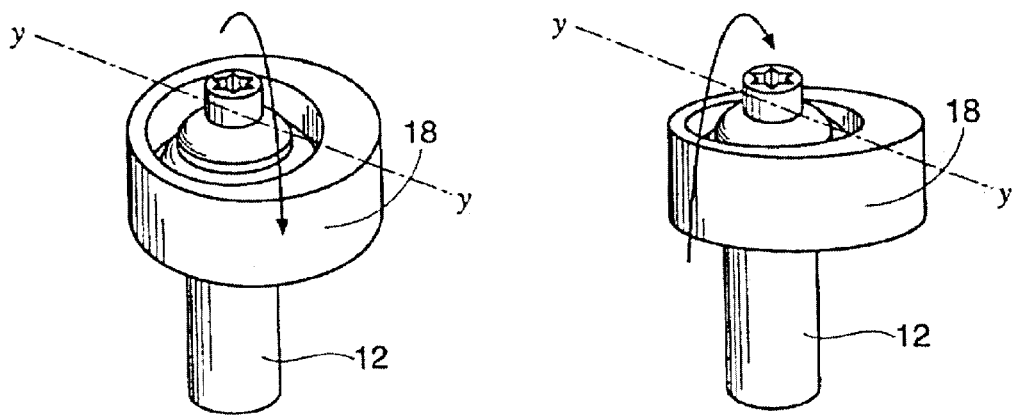

Second, as represented by arrows in FIGS. 9c–9d, the mounting hub 18 can be rocked or rotated about the y-axis, as also previously described for system 10A.

Figure 9E:
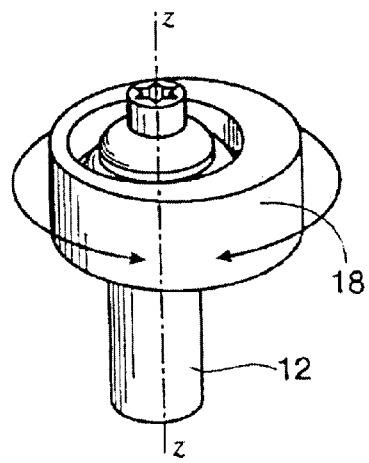

Third, as represented by arrows in FIG. 9e, the mounting hub 18 can be rotated up to 360.degrees in either direction about the z-axis, as previously described for system 10A.

As best illustrated in FIGS. 7 and 8, when the mounting hub 18 includes an interior hub 22 that is eccentric relative to the mounting surface 24, the distance from the pivot pin 12 to the mounting surface 24 increases to a maximum value, depicted as point A1 and then decreases to a minimum value, depicted as point A2.

Reorientation or translation of the linear position of point A1 and point A2 with respect to the pivot pin 12 is possible when the mounting hub 18 is rotated about the z-axis.

Reorientation of points A1 and A2 with respect to the x-axis provides a fourth degree of freedom. Similarly, reorientation of points A1 and A2 with respect to the y-axis provides a fifth degree of freedom.

It is to be understood that the rotational and rocking movements just described permit adjustment in virtually an infinite number of directions.

After the desired position is obtained, the locking screw 20 is tightened to secure the mounting hub 18 in the desired position, as previously described for System 10A (see FIG. 5c).

In some instances, it may be desirable to limit the range of motion or degrees of freedom of the adjustable mount. Two additional systems (System 3 and System 4) that limit the range of motion of the adjustable mount will now be described.

C. System 3: 5-Washer System with Washers Engaged with the Hub and Post to Restrict Rotation About the Z-Axis in the Locked Position.

Figure 11:
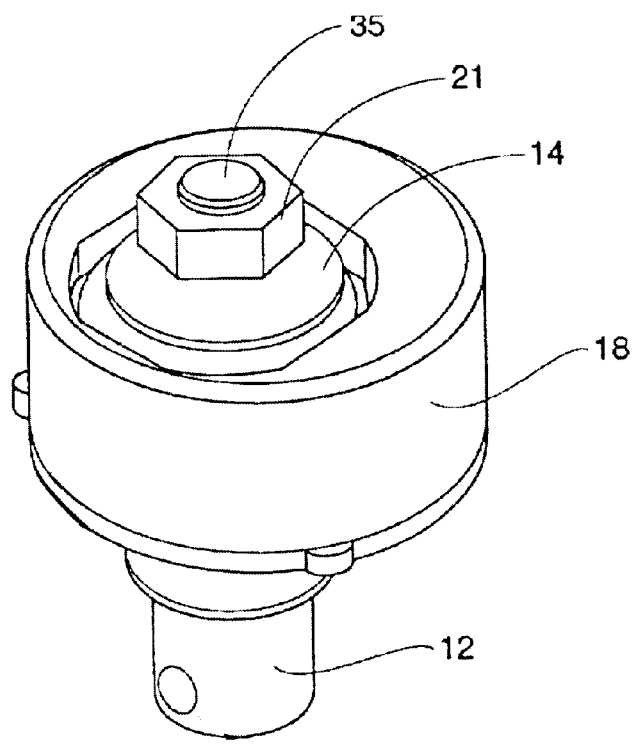
FIG. 11 is an assembled perspective view of assembled components of the system shown in FIG. 10.

FIG. 10 shows the individual components of an alternative system 10C providing an adjustable locking mount system that restricts rotation about the z-axis when locked. FIGS. 11 and 12 illustrate the system 10C when assembled.

The system 10C comprises a pivot pin 12, three slip washers 14, two lock washers 16, a mounting hub 18, and a fastener 21, e.g., a nut. While the illustrated embodiment depicts a five-washer system, a greater or lesser number of slip washers 14 and lock washers 16 can be provided, as previously described.

As best seen in FIG. 10, the outside surface of lock washer 16 and the inside surface of the interior hub 22 of mounting hub 18 have mating surfaces. This arrangement essentially prevents any rotation between the lock washers 16 and the mounting hub 18.

Additionally, the pivot pin 12 has a post 35 protruding from the top with an outer diameter shaped to mate with a similarly-shaped inner diameter on the slip washers 14 to prevent rotation between the post 35 and the slip washers 14.

For example, in the embodiment illustrated in FIGS. 10–12, the outside surface of the lock washer, the inner surface of the interior hub 22, and the post 35 have complementary hexagonal configurations.

This arrangement permits all degrees of freedom as previously described for systems 10A and 10B, but has additional restriction to movement about the z-axis when in the locked position.

Tightening of the fastener 21 serves to secure the mounting hub 18 in the desired position, as previously described for Systems 10A and 10B.

D. System 4: Flat Washer System

Figure 14:
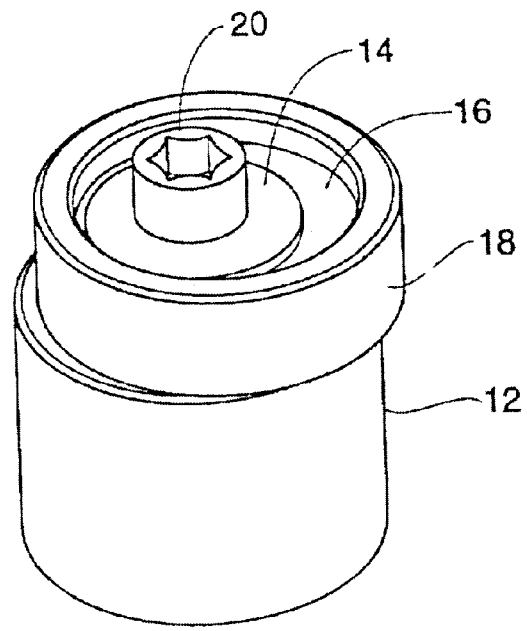
FIG. 14 is an assembled perspective view of the system shown in FIG. 13.
Figure 15:
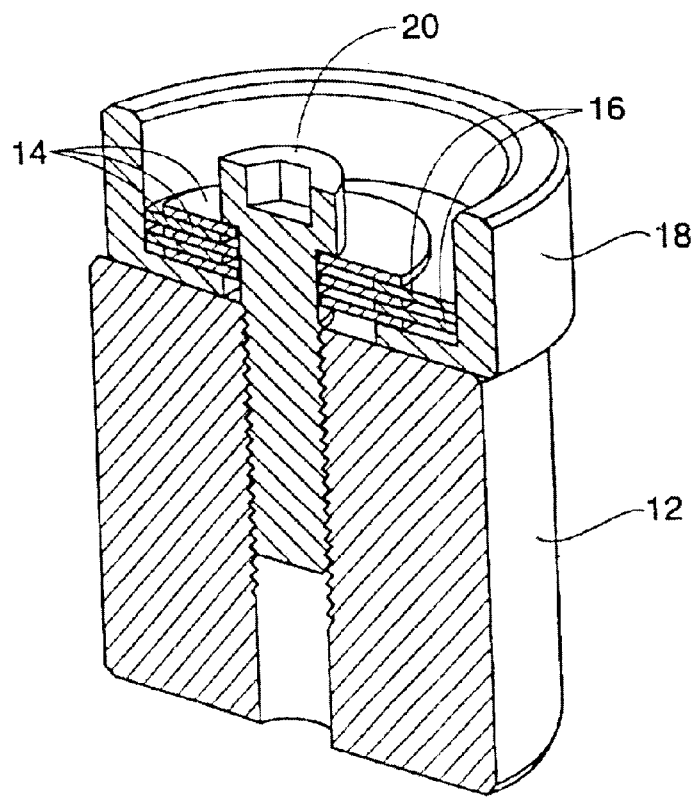
FIG. 15 is side sectional view of the assembled components of the system in FIG. 13.

FIG. 13 shows the individual components of an alternative system 10D providing an adjustable locking mount system that provides rotational movement about the z-axis and linear movement along the x and y axes. FIGS. 14–15 illustrate the system 10D when assembled.

Similar to system 10C, the system 10D comprises a pivot pin 12, three slip washers 14, two lock washers 16, a mounting hub 18, and a locking screw 20. The invention also contemplates embodiments having a greater or lesser number of slip washers 14 and lock washers 16.

In this embodiment, the pivot pin 12, slip washers 14, lock washers 16, and mounting hub 18 each have flat surfaces.

Figure 16A:
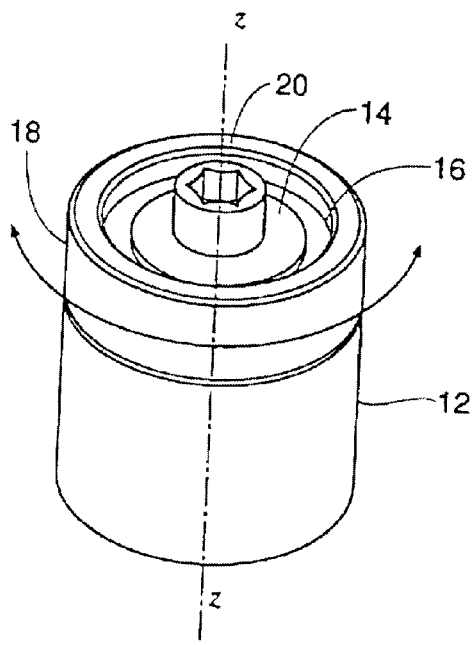
FIGS. 16a–16c illustrate movement of the cooperating parts of the assembled system shown in FIG. 14.

As represented by arrows in FIG. 16a, this arrangement permits 360.degree. rotational movement in either a clockwise or counterclockwise direction about the z-axis (i.e., axis of the pivot pin 12).

Figure 16B:
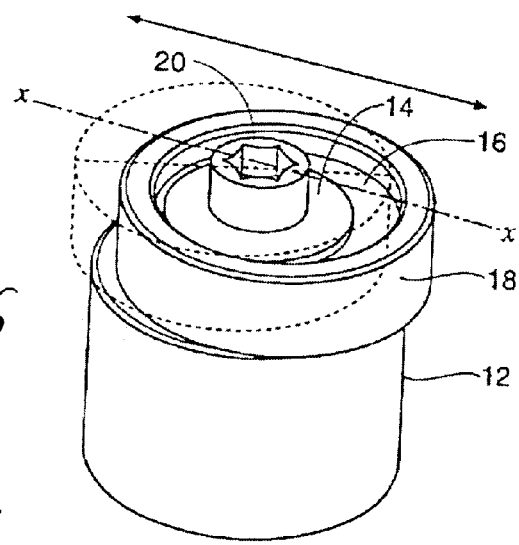
Figure 16C:
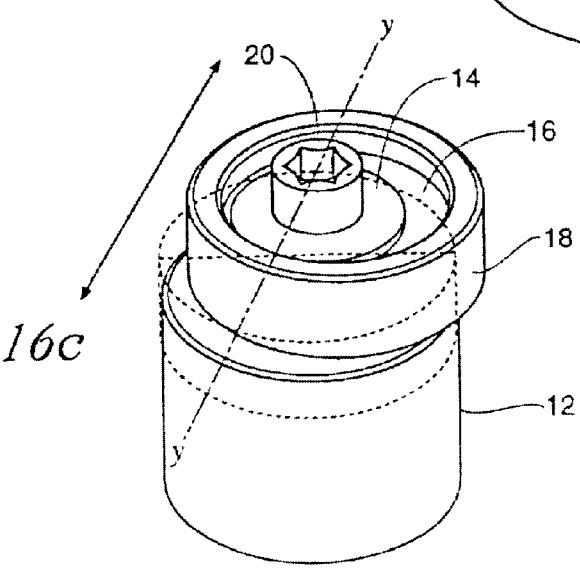

As represented by arrows and phantom lines in FIG. 16b, the mounting hub 18 can also be moved linearly along the x-axis (i.e., side to side translation). The mounting hub 18 can also be moved linearly along the y-axis (i.e., front to back translation), as represented by arrows and phantom lines in FIG. 16c. However, because of the flat surfaces of the pivot pin 12, mounting hub 18, slip washer(s) 14, and lock washer(s) 16, rotational ranges of motion along the x and y axes are essentially prevented.

As represented with the previous embodiments 10A–10C, tightening the screw 20 compresses the washers 14 and 16 together and multiplies the frictional forces between surfaces to restrict motion between the hub 18 and the pivot pin 12.

II. Representative Use of System

A. Composite Mounting Assembly

Figure 32:
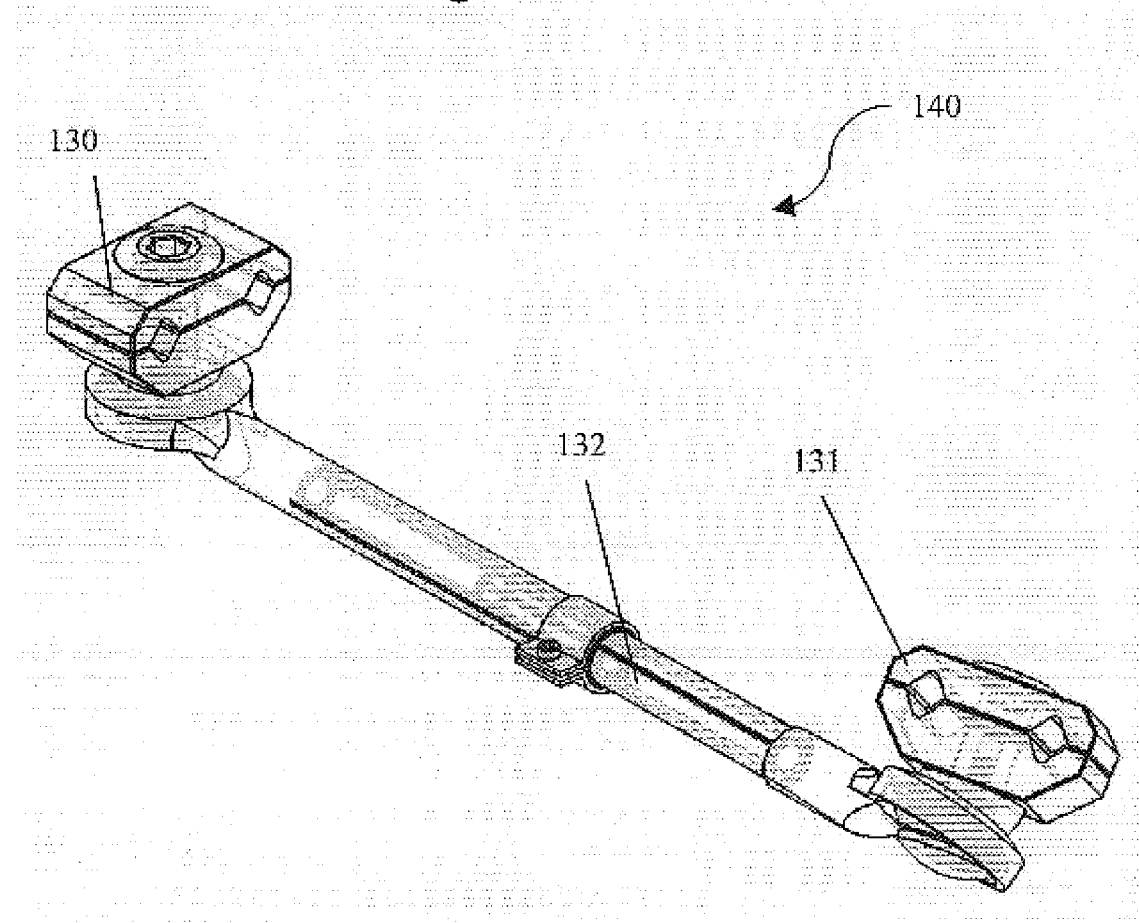
FIG. 32 is a perspective, transparent view of an adjustable mount system composed of 3 adjustable mount assemblies according to the present invention.
Figure 33:
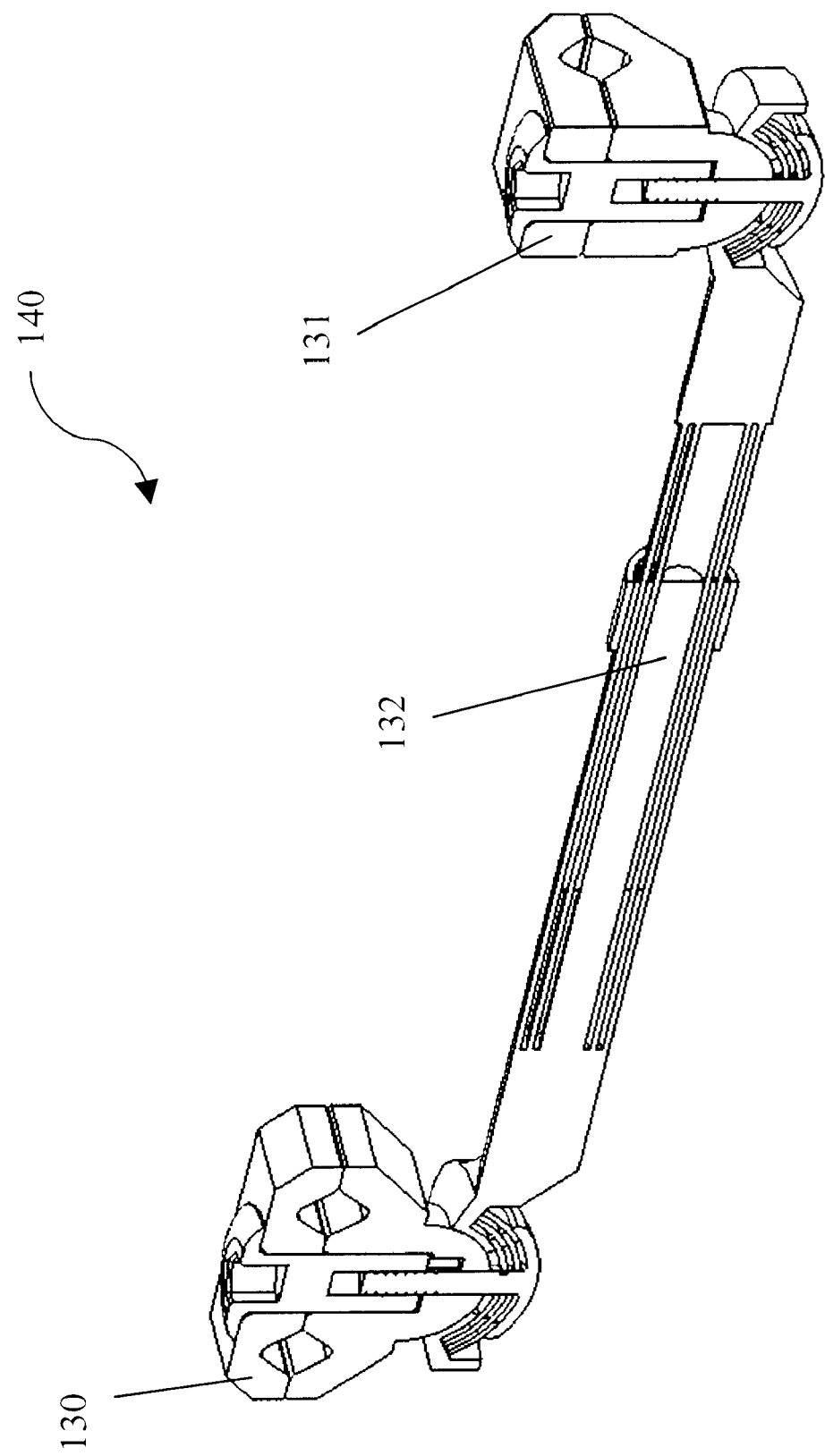
FIG. 33 is a perspective, cut-away view of an adjustable mount system composed of 3 adjustable mount assemblies according to the present invention.

The adjustable mount of any of the systems 10A–10D just described can be used alone as a single mount. Alternatively, multiple mounts can be coupled together to form a composite mounting assembly. Further, mounts of different systems can be coupled together. For example, a mount of the type of system 10A could be coupled to a mount or mounts of the type of system 10B. It is apparent that any number of mounts can be coupled together. Additionally, multiple mounts can be coupled by yet another mount, as shown in FIGS. 32 and 33.

FIGS. 17a–17d provide examples of three such composite mounting assemblies contemplated by the invention. In the illustrated embodiments, a series of multiple mounting frames 98 each house an adjustable mount having a mounting hub 18, as described for any of the systems 10A–10D. The frames 98 are attached along an orientation axis, designated OA in FIGS. 17a–17d. The orientation axis OA can be linear (see FIGS. 17a, 17b, and 17d) or curvilinear (see FIG. 17c).

Figure 17C:
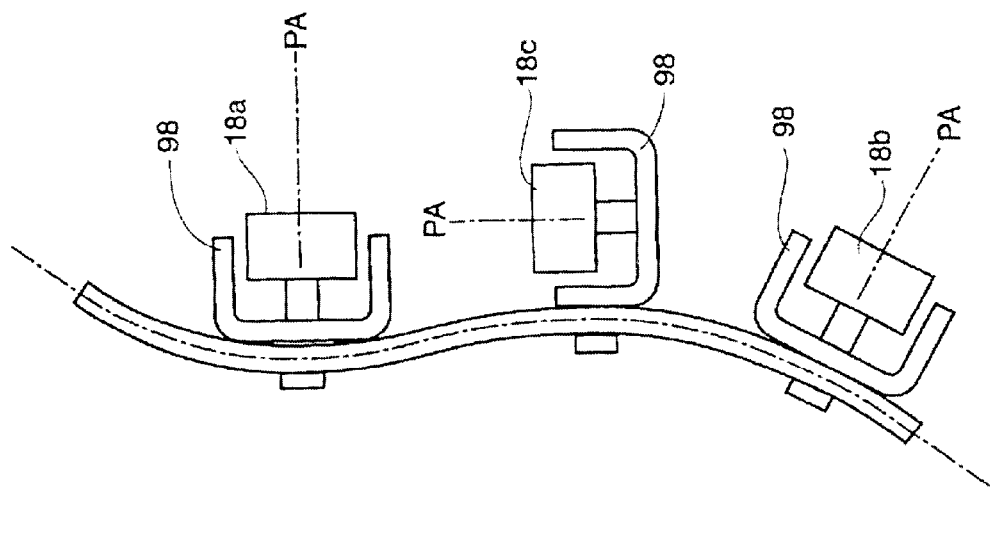
FIGS. 17a–17d illustrate various embodiments of composite mounting assemblies embodying features of the invention.
Figure 17B:
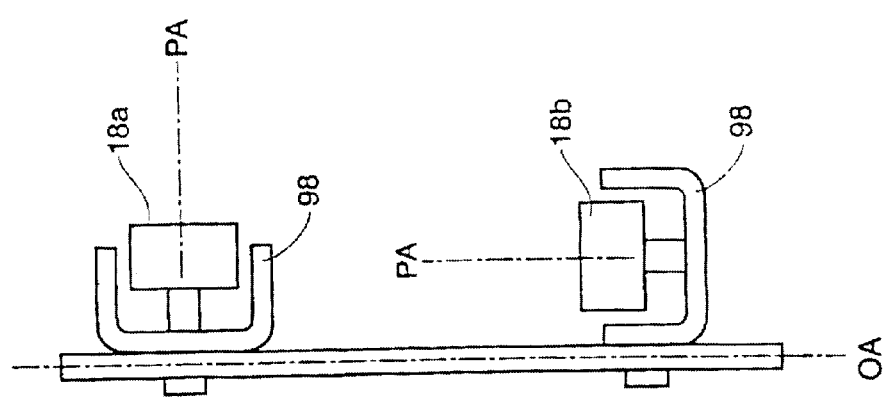
Figure 17A:
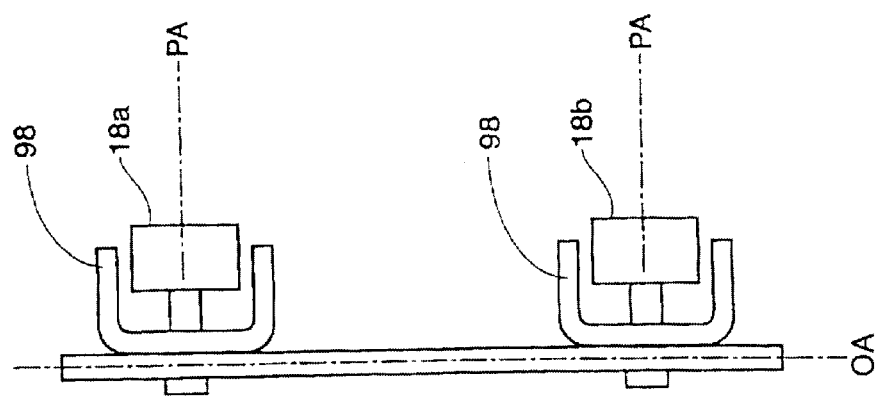
Figure 17D:
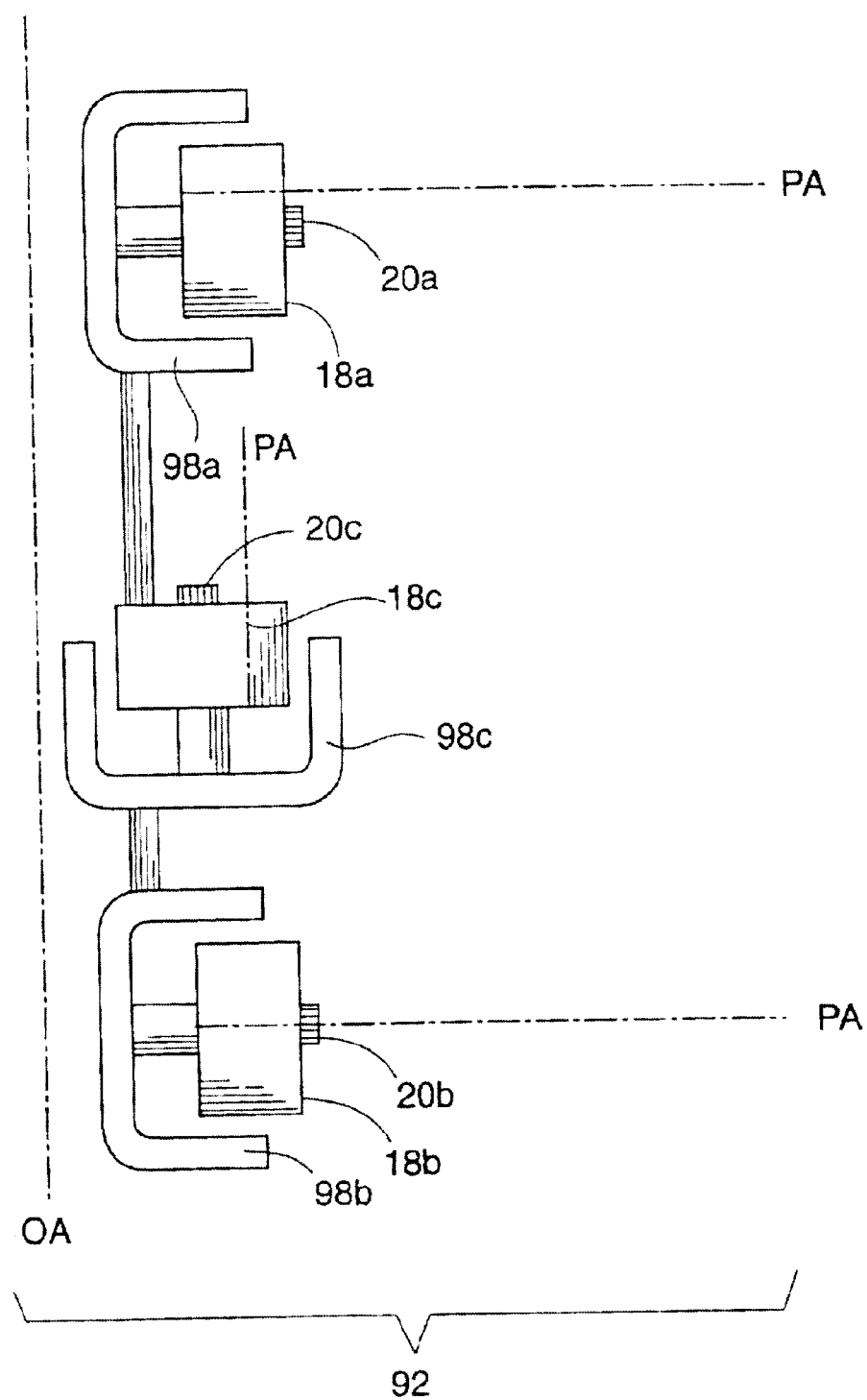

As FIGS. 17a–17d illustrate, adjacent frames 98 can be joined in a fixed relationship by various methods, e.g., fastener, weld, or spacing member. That is, the frames 98 can be coupled side-by-side or in a spaced-apart relationship. In the embodiments shown in FIGS. 16a–16c, a spaced-apart relationship is employed. Alternately, as seen in FIG. 17d, a mounting hub 18 can be joined, either directly or through a spacing member, to an adjacent frame 98.

Each mounting hub 18 has a pivot axis, designated PA in FIGS. 17a–17d. The pivot axis PA can either extend generally along the orientation axis OA or be generally transverse to the orientation axis OA.

FIG. 17a illustrates an arrangement in which first and second mounting hubs 18a and 18b have pivot axes PA generally transverse to the orientation axis OA. In FIG. 17b, mounting hub 18a has a pivot axis PA generally transverse to the orientation axis OA, while mounting hub 18b has a pivot axis PA that generally extends along the orientation axis OA.

FIGS. 17c and 17d show embodiments having first, second, and third mounting hubs 18a, 18b, and 18c. In the embodiments illustrated in FIGS. 17c and 17d, mounting hubs 18a and 18b have pivot axes PA generally transverse to the orientation axis OA, while mounting hub 18c has a pivot axis PA that generally extends along the orientation axis OA.

FIGS. 32 and 33 show an embodiment of a composite mounting assembly, generally referenced as 140, having first 130, second 131, and third 132 mounting assemblies wherein the first and second assemblies, which are terminal assemblies, are connected by a third connector assembly which is curviplanar in one dimension and platyplanar in the second. This configuration allows the two terminal assemblies to be translated and rotated with respect to one another. Such a system can be used for a variety of purposes, including biomedical applications, such as an orthopedic external fixation devices used to stabilize fractures. A biomedical external fixation device according to the present invention, an example of which is shown in FIGS. 32 and 33, is especially suited for this purpose. The external fixation device for biomedical applications includes a composite mounting assembly affixable at an exterior portion of a body for releasably securable mounting at least two mounting assemblies, wherein at least one of the assemblies includes a multi-laminae adjustable mount assembly. The multi-laminae adjustable mount assembly includes at least two mounting components, each with a mounting area. The movement of each mounting component constrained by a respective series of stacked, compressible laminae. The at least two compressor laminae are compressible in opposition by a compression device. The stacked laminae series are interleaved and the compression device compresses the stacked, interleaved laminae, thereby providing an adjustable mount assembly that has a high holding strength per unit of compression pressure, high holding strength per unit of mass and volume, low immobilization compression pressure, and causes no permanent deformation of compressed components to achieve holding strength.

Such a device has greater static friction generated per unit torque than the possible errant torque applied, thereby allowing the assembly to be immobilized prior to the exertion of high torque, which prevents slipping of the components relative to one another if the torque applied is not applied in a balanced, symmetrical manner. This characteristic of locking at low torque reduces the chances of the device alignment slipping during the locking process. Additionally, the ability to achieve a high holding strength with lower torque allows the device to be locked into position without inadvertently displacing the entire device and potentially shifting the device and/or orthopedic pins.

Any of the systems 10A–10D are suitable for use in mounting an object or device on another object, device, or structure. An illustration of one such use will now be provided. It is to be understood that the following example is merely illustrative and that features of the invention can be employed in an infinite number of circumstances to mount a variety of objects and devices onto various objects, devices, and structures.

B. Mounting of an Object or Device

Figure 18:
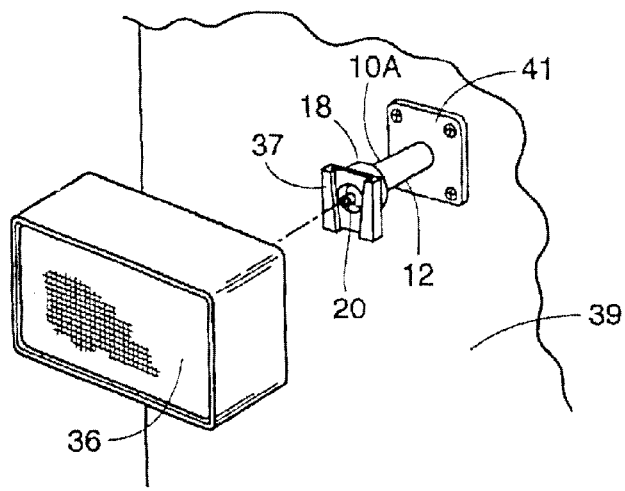
FIG. 18 is a perspective view of a wall, and illustrating an adjustable locking mount that embodies features of the invention mounted onto the wall and further illustrating a stereo speaker to be mounted on the mount.
Figure 19:
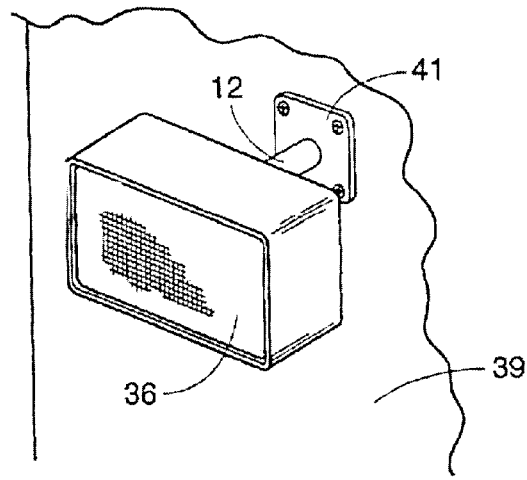
FIG. 19 is view similar to FIG. 18 and illustrating the speaker mounted on the mount.
Figure 20:
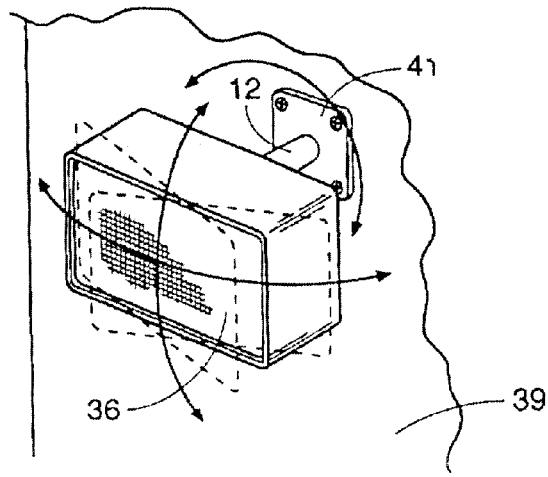
FIG. 20 is a view similar to FIG. 19 and illustrating the position of the speaker being adjusted by rocking and rotational movement.

FIGS. 18–20 detail the use of an adjustable mount of the type described for systems 10A–10D to mount a stereo speaker 36 on a wall 39. In the embodiment illustrated in FIGS. 18–20, the mount of system 10A is employed.

As shown in FIG. 18, the system 10A is first fixed onto a wall 39 using a mounting base 41. In this arrangement, the locking screw 20 is tightened enough to secure the assembled system 10A, but loose enough to permit adjustment of the mounting hub 18. A mounting bracket 37 is then coupled to the mounting hub 18.

Next, as seen in FIG. 19, the stereo speaker 36 is mounted onto the mounting hub 18 using the mounting bracket 37.

Finally, the position of the speaker 36 is adjusted. The position of the speaker 36 is adjusted by a combination of rotational and rocking movement along the x, y, and z axes as permitted until the desired position is obtained, as illustrated by arrows and phantom lines in FIG. 20.

This arrangement permits the position of the speaker 36 to subsequently be selectively adjusted, i.e., does not secure or fix the speaker 36 in a desired position.

In an alternate arrangement, the speaker 36 can be secured in a desired position. In this arrangement, the system 10A is first fixed onto a wall 39, as previously described (see FIG. 18). Then, the position of the mounting hub 18 is adjusted until the desired position is obtained (see, e.g., FIGS. 4a–4e). Next, the desired position is fixed by tightening the locking screw 20 (see FIG. 5c). Finally, the speaker 36 is mounted onto the mounting hub 18, as previously described (see FIG. 19).

This arrangement secures the speaker 36 in a fixed position, i.e., does not permit subsequent selective adjustment of the position of the speaker 36 without release of the locking screw.

In a similar manner, a composite mounting assembly can be employed to mount a series of objects or devices, e.g., track lighting (not shown). The foregoing is considered as illustrative only of the principles of the invention. Furthermore, since numerous modifications and changes will readily occur to those skilled in the art, it is not desired to limit the invention to the exact construction and operation shown and described. While preferred embodiments have been described, the details may be changed without departing from the invention, which is defined by the claims.

We claim:

1. An external fixation device for biomedical applications comprising
    a composite mounting assembly affixable at an exterior portion of a body for releasably securable mounting at least two mounting assemblies, wherein at least one of the assemblies includes a multi-laminae adjustable mount assembly, comprising:
        at least two mounting components;
        each with a mounting area;
        the movement of each mounting component constrained by a respective series of stacked, compressible laminae;
        at least two compressor laminae compressible in opposition; and
        a compression device;
    wherein the stacked laminae series are interleaved and the compression device compresses the stacked, interleaved laminae.

2. The external fixation device according to claim 1, wherein two of the mounting assemblies are multi-laminae adjustable mount assemblies.

3. The external fixation device according to claim 1, wherein at least two of the mounting assemblies are connected by a connector assembly.

4. The external fixation device according to claim 1, wherein at least two of the mounting assemblies are terminal assemblies, and the terminal assemblies are connected by a connector assembly.

5. The external fixation device according to claim 1, wherein the adjustable mount system is affixed to at least one orthopedic pin.

6. The external fixation device as in claim 1 further including a guidance mechanism to maintain the alignment of the laminae series.

7. The device of claim 6, wherein the guidance mechanism is incorporated into the laminae.

8. The device of claim 7, wherein the incorporated guidance mechanism is a tongue-in-groove design.

9. The device of claim 1, wherein the laminae are structurally reinforced.

10. The device of claim 9, wherein the reinforcement is at least one longitudinal fold.

11. The external fixation device as in claim 1, wherein at least one mounting area is eccentric.

12. The external fixation device as in claim 1, wherein the laminae are platyplanar.

13. The external fixation device as in claim 12, wherein the laminae are rectangular.

14. The external fixation device as in claim 12, wherein the laminae are circular and provide rotational movement.

15. The external fixation device as in claim 1, wherein the laminae are platyplanar in one dimension and curviplanar in the second dimension.

16. The external fixation device of claim 1, wherein the laminae are circular and curviplanar in two dimensions and allow rotation around the x-, y-, and z-axes when uncompressed.

17. The external fixation device of claim 1, wherein complementary surfaces between the laminae and respective mounting component are non-circular and the laminae are curviplanar in two dimensions and allow rotation around the x-, y-, and z-axes when uncompressed.

18. The external fixation device of claim 1, wherein the compression device is screw-based.

19. The external fixation device of claim 18, wherein the compression device includes an internal connector and the laminae include a hole permitting the connector to pass.

20. The external fixation device of claim 1, wherein the compression device is pneumatic.

21. The external fixation device of claim 1, wherein the compression device is a ratchet.

22. The external fixation device of claim 1, wherein the relative movement of the at least two mounting components is allowed in at least one of the three axes of movement when the laminae series are uncompressed.

23. The external fixation device of claim 22, wherein the relative movement of the at least two mounting components is allowed in at least two of the three axes of movement.

24. The external fixation device of claim 22, wherein the relative movement of the at least two mounting components is allowed in all three axes of movement.

25. The external fixation device as in claim 22, wherein at least one mounting area is eccentric.

* * * * *